(12) United States Patent
Gilat et al.

(10) Patent No.: US 12,513,035 B2
(45) Date of Patent: Dec. 30, 2025

(54) SPREAD-SPECTRUM VIDEO TRANSPORT WITH ORTHOGONAL FREQUENCY DIVISION MULTIPLEXING AND OFDM VIDEO TRANSPORT

(71) Applicant: HYPHY USA INC., San Jose, CA (US)

(72) Inventors: Ofir Gilat, Givatayim (IL); Mordechai Litochevski, Ya'akov (IL)

(73) Assignee: HYPHY USA Inc., San Jose, CA (US)

( * ) Notice: Subject to any disclaimer, the term of this patent is extended or adjusted under 35 U.S.C. 154(b) by 52 days.

(21) Appl. No.: 18/448,330

(22) Filed: Aug. 11, 2023

(65) Prior Publication Data

US 2024/0064052 A1 Feb. 22, 2024

Related U.S. Application Data

(60) Provisional application No. 63/500,341, filed on May 5, 2023, provisional application No. 63/421,062, filed
(Continued)

(51) Int. Cl.
*H04L 27/26* (2006.01)
*H03M 1/66* (2006.01)

(52) U.S. Cl.
CPC .......... *H04L 27/2634* (2013.01); *H03M 1/66* (2013.01); *H04L 27/26412* (2021.01)

(58) Field of Classification Search
CPC . H04L 27/2634; H04L 27/26412; H03M 1/66
See application file for complete search history.

(56) References Cited

U.S. PATENT DOCUMENTS 3,204,035 A 8/1965 Ballard et al.
3,795,765 A 3/1974 DeGroat et al.
(Continued)

FOREIGN PATENT DOCUMENTS

CN 101933277 12/2010
CN 101969319 2/2011
(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.
(Continued)

*Primary Examiner* — Rahel Guarino
(74) *Attorney, Agent, or Firm* — Beyer Law Group LLP

(57) ABSTRACT

An orthogonal frequency division multiplexing (OFDM) transmitter maps a digital level into I and Q components. The transmitter uses every other digital level as an I or Q component or divides the MSBs and LSBs of a digital level into the I and Q components. An analog OFDM transmitter uses a pair of input analog levels as the I and Q components. An inverse FFT outputs a complex value and OFDM symbols are transmitted. An inverse FFT may also output a real value using complex conjugates. An optional encoder encodes digital or analog samples into L levels using N orthogonal codes before input into the OFDM transmitter. OFDM receivers receive the OFDM signal and output digital or analog samples. Video signals are input into a distributor that distributes analog or digital samples into vectors, each vector input into an OFDM transmitter that transmits to a corresponding receiver.

39 Claims, 24 Drawing Sheets

Related U.S. Application Data on Oct. 31, 2022, provisional application No. 63/398,460, filed on Aug. 16, 2022.

(56) References Cited

U.S. PATENT DOCUMENTS

| | | | |
|---|---|---|---|
| 5,793,759 | A | 8/1998 | Rakib et al. |
| 5,796,774 | A | 8/1998 | Kato |
| 5,870,414 | A | 2/1999 | Chaib et al. |
| 5,936,997 | A | 8/1999 | Kanda |
| 5,938,787 | A | 8/1999 | Stark et al. |
| 5,956,333 | A | 9/1999 | Zhou et al. |
| 5,966,376 | A | 10/1999 | Rakib et al. |
| 6,018,547 | A | 1/2000 | Arkhipkin |
| 6,128,309 | A | 10/2000 | Tariki et al. |
| 6,154,456 | A | 11/2000 | Rakib et al. |
| 6,289,039 | B1 | 9/2001 | Garodnick |
| 6,310,923 | B1 | 10/2001 | Lee et al. |
| 6,456,607 | B2 | 9/2002 | Arai et al. |
| 6,480,559 | B1 | 11/2002 | Dabak et al. |
| 6,751,247 | B1 | 6/2004 | Zhengdi |
| 6,763,009 | B1 | 7/2004 | Bedekar et al. |
| 6,956,891 | B2 | 10/2005 | Tan et al. |
| 7,027,102 | B2 | 4/2006 | Sacca |
| 7,710,910 | B2 | 5/2010 | Ode et al. |
| 7,793,022 | B2 | 9/2010 | Travers et al. |
| 7,796,575 | B2 | 9/2010 | Lim et al. |
| 7,873,097 | B1 | 1/2011 | Luecke et al. |
| 7,873,980 | B2 | 1/2011 | Horan et al. |
| 7,908,634 | B2 | 3/2011 | Keady et al. |
| 7,937,605 | B2 | 5/2011 | Rea et al. |
| 7,996,584 | B2 | 8/2011 | Keady et al. |
| 8,073,647 | B2 | 12/2011 | Horan et al. |
| 8,094,700 | B2 | 1/2012 | Okazaki |
| 8,272,023 | B2 | 9/2012 | Horan et al. |
| 8,280,668 | B2 | 10/2012 | Horan et al. |
| 8,295,296 | B2 | 10/2012 | Keady et al. |
| 8,369,794 | B1 | 2/2013 | Bharghavan et al. |
| RE44,199 | E | 5/2013 | Garodnick |
| 8,520,776 | B2 | 8/2013 | Rea et al. |
| 8,546,688 | B2 | 10/2013 | Horan et al. |
| 8,674,223 | B2 | 3/2014 | Horan et al. |
| 8,674,224 | B2 | 3/2014 | Horan et al. |
| 8,674,225 | B2 | 3/2014 | Horan et al. |
| 8,674,226 | B2 | 3/2014 | Horan et al. |
| 8,680,395 | B2 | 3/2014 | Horan et al. |
| 8,705,588 | B2 | 4/2014 | Odenwalder |
| 9,324,478 | B2 | 4/2016 | Horan et al. |
| 9,970,768 | B2 | 5/2018 | Monroe et al. |
| 10,158,396 | B2 | 12/2018 | Hannebauer et al. |
| 10,763,914 | B2 | 9/2020 | Hannebauer et al. |
| 11,025,292 | B2 | 6/2021 | Hannebauer et al. |
| 11,394,422 | B2 | 7/2022 | Hannebauer et al. |
| 11,463,125 | B2 | 10/2022 | Hannebauer et al. |
| 11,716,114 | B2 | 8/2023 | Hannebauer |
| 2001/0050728 | A1* | 12/2001 | Edwards ............... G09G 3/3648 349/33 |
| 2002/0013926 | A1 | 1/2002 | Kim et al. |
| 2002/0097779 | A1 | 7/2002 | Bang et al. |
| 2002/0154620 | A1 | 10/2002 | Azenkot et al. |
| 2002/0162074 | A1 | 10/2002 | Bickerstaff |
| 2003/0139178 | A1 | 7/2003 | Uesugi et al. |
| 2004/0120415 | A1 | 6/2004 | Song et al. |
| 2005/0069020 | A1 | 3/2005 | Lakkis |
| 2005/0243956 | A1 | 11/2005 | Fernald et al. |
| 2006/0080711 | A1 | 4/2006 | Kim |
| 2008/0056357 | A1 | 3/2008 | Chan et al. |
| 2008/0084920 | A1 | 4/2008 | Okazaki |
| 2008/0106306 | A1 | 5/2008 | Keady et al. |
| 2009/0040167 | A1 | 2/2009 | Sun |
| 2009/0046044 | A1 | 2/2009 | Chen |
| 2009/0296840 | A1* | 12/2009 | Atungsiri ............ H04L 27/2602 375/260 |
| 2010/0013579 | A1 | 1/2010 | Horan et al. |
| 2010/0020675 | A1* | 1/2010 | Choi ................... H04L 27/2627 370/210 |
| 2010/0061698 | A1 | 3/2010 | Morello et al. |
| 2010/0091990 | A1 | 4/2010 | Etemad et al. |
| 2010/0142723 | A1 | 6/2010 | Bucklen |
| 2010/0321591 | A1 | 12/2010 | Onomatsu |
| 2011/0037574 | A1 | 2/2011 | Pratt et al. |
| 2011/0044409 | A1 | 2/2011 | Yoshimoto et al. |
| 2011/0169870 | A1 | 7/2011 | Yang et al. |
| 2012/0014464 | A1 | 1/2012 | Eiger et al. |
| 2012/0047229 | A1 | 2/2012 | Bennett |
| 2013/0194284 | A1 | 8/2013 | Bi |
| 2014/0028645 | A1 | 1/2014 | Yamazaki et al. |
| 2014/0077706 | A1 | 3/2014 | Aldrich et al. |
| 2014/0218616 | A1 | 8/2014 | Toba et al. |
| 2014/0340431 | A1 | 11/2014 | Yamakawa |
| 2016/0127087 | A1 | 5/2016 | Feher |
| 2018/0027257 | A1 | 1/2018 | Izumi et al. |
| 2018/0309598 | A1 | 10/2018 | Campos et al. |
| 2018/0337687 | A1 | 11/2018 | Adjiwibawa et al. |
| 2019/0088227 | A1 | 3/2019 | Matsumoto |
| 2019/0174027 | A1 | 6/2019 | Lv et al. |
| 2019/0260629 | A1 | 8/2019 | Nikopour et al. |
| 2019/0342564 | A1 | 11/2019 | Kurokawa |
| 2020/0013332 | A1* | 1/2020 | Kimura ................ G09G 3/3233 |
| 2020/0014419 | A1 | 1/2020 | Hannebauer et al. |
| 2020/0043440 | A1 | 2/2020 | Qiu et al. |
| 2021/0203904 | A1 | 7/2021 | Wetzstein et al. |
| 2021/0319764 | A1 | 10/2021 | Toyotaka et al. |
| 2021/0327366 | A1 | 10/2021 | Maeda et al. |
| 2022/0101799 | A1 | 3/2022 | Lee et al. |
| 2022/0302953 | A1 | 9/2022 | Hannebauer et al. |
| 2022/0368369 | A1 | 11/2022 | Hannebauer et al. |
| 2022/0397931 | A1 | 12/2022 | Song et al. |
| 2023/0139147 | A1 | 5/2023 | Chae |
| 2023/0223981 | A1 | 7/2023 | Hannebauer |
| 2023/0230559 | A1 | 7/2023 | Friedman |
| 2023/0327702 | A1 | 10/2023 | Hannebauer et al. |
| 2024/0212576 | A1 | 6/2024 | Lee et al. |

FOREIGN PATENT DOCUMENTS

| | | | |
|---|---|---|---|
| CN | 101917209 | 7/2015 | |
| CN | 105025294 | * 11/2015 | ........... H04N 19/115 |
| CN | 210390948 | 4/2020 | |
| EP | 0 727 881 | 8/1996 | |
| EP | 1 079 536 | 2/2001 | |
| EP | 1 968 324 | 9/2008 | |
| EP | 3979229 | 4/2022 | |
| JP | 08293818 | 11/1996 | |
| JP | H09312590 | 12/1997 | |
| JP | 2001-144653 | 5/2001 | |
| JP | 2001156861 | 6/2001 | |
| JP | 2001510658 | 7/2001 | |
| JP | 2002281545 | 9/2002 | |
| JP | 2007-150971 | 6/2007 | |
| JP | 2011003331 | 6/2011 | |
| KR | 10-2019-0026701 | 3/2019 | |
| WO | WO 97/02663 | 1/1997 | |
| WO | WO 98/52365 | 11/1998 | |
| WO | WO 2007/075052 | 7/2007 | |
| WO | 2010/106330 | 9/2010 | |
| WO | 2018-170546 | 9/2010 | |
| WO | WO 2012/007785 | 1/2012 | |
| WO | WO 2017/049347 | 3/2017 | |

OTHER PUBLICATIONS

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

(56) References Cited

OTHER PUBLICATIONS

International Search Report and Written Opinion dated Dec. 26, 2023 from International Application No. PCT/US2023/030056.

\* cited by examiner

OFDM with Complex Number Input

OFDM Transmitter with Digital Input Mapped to Complex Numbers

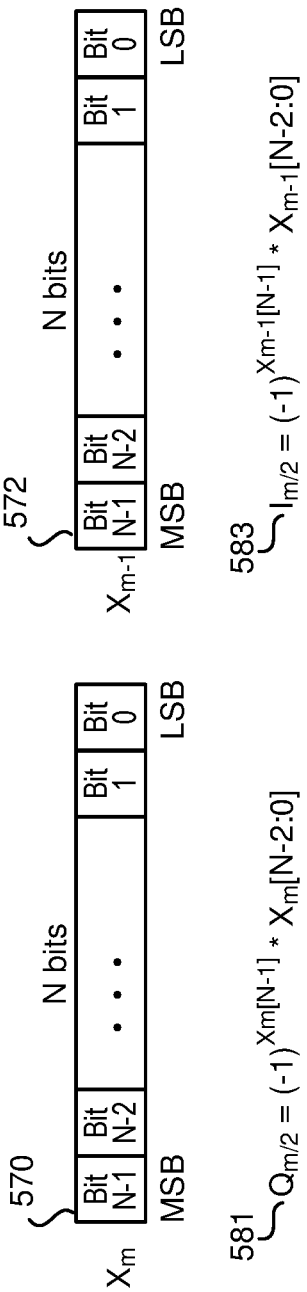
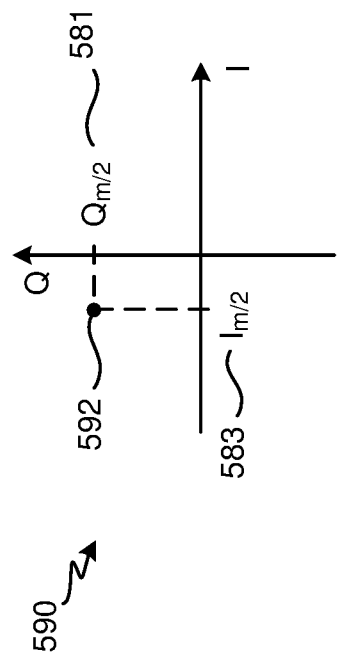
FIG. 4A
FIG. 4B

16-QAM Constellation with Analog Mapping

OFDM Transmitter with Analog Input Mapped to Complex Numbers

OFDM Transmitter with Digital Input and Real Number Output from IFFT

OFDM Transmitter with Analog Input and Real Number Output from IFFT

IFFT Bins for Real Output

Digital Encoding of Sampled Signals Integrated with OFDM Transmitter

Encoding of Analog Values

Decoding Analog Input Levels

Display Unit

Digital OFDM Receiver with Analog Output at Source Driver

Analog OFDM Receiver with Analog Output at Source Driver

| S/H AMPLIFIER NUMBER | 0 | 0 | 1 | 2 | | 61 | 62 | 63 |
|---|---|---|---|---|---|---|---|---|
| | 1 | 64 | 65 | 66 | | 125 | 126 | 127 |
| | 2 | 128 | 129 | 130 | | 189 | 190 | 191 |
| | 3 | 192 | 193 | 194 | | 253 | 254 | 255 |
| | 4 | 256 | 257 | 258 | | 317 | 318 | 319 |
| | 5 | 320 | 321 | 322 | | 381 | 382 | 383 |
| | 6 | 384 | 385 | 386 | | 445 | 446 | 447 |
| | 7 | 448 | 449 | 450 | ... | 509 | 510 | 511 |
| | 8 | 512 | 513 | 514 | | 573 | 574 | 575 |
| | 9 | 576 | 577 | 578 | | 637 | 638 | 639 |
| | 10 | 640 | 641 | 642 | | 701 | 702 | 703 |
| | 11 | 704 | 705 | 706 | | 765 | 766 | 767 |
| | 12 | 768 | 769 | 770 | | 829 | 830 | 831 |
| | 13 | 832 | 833 | 834 | | 893 | 894 | 895 |
| | 14 | 896 | 897 | 898 | | 957 | 958 | 959 |
| | 15 | 0 | 1 | 2 | ... | 61 | 62 | 63 |

RGB SUB-PIXEL INDICES COLLECTED
BY EACH S/H AMPLIFIER OF A SOURCE DRIVER

SPREAD-SPECTRUM VIDEO TRANSPORT WITH ORTHOGONAL FREQUENCY DIVISION MULTIPLEXING AND OFDM VIDEO TRANSPORT

CROSS-REFERENCE TO RELATED APPLICATIONS

This application claims priority of U.S. provisional patent application No. 63/398,460, filed Aug. 16, 2022, entitled "SPREAD-SPECTRUM VIDEO TRANSPORT WITH ORTHOGONAL FREQUENCY DIVISION MULTIPLEXING," U.S. provisional patent application No. 63/421,062, filed Oct. 31, 2022, entitled "SPREAD-SPECTRUM VIDEO TRANSPORT WITH ORTHOGONAL FREQUENCY DIVISION MULTIPLEXING AND OFDM VIDEO TRANSPORT" and U.S. provisional patent application No. 63/500,341, filed May 5, 2023, entitled "ANALOG VIDEO TRANSPORT TO A DISPLAY PANEL AND SOURCE DRIVER INTEGRATION WITH A DISPLAY PANEL," all of which are hereby incorporated by reference.

This application incorporates by reference U.S. application Ser. No. 15/925,123, filed on Mar. 19, 2018, now U.S. Pat. No. 10,158,396, issued Dec. 18, 2018, U.S. application Ser. No. 16/494,901 filed on Sep. 17, 2019, U.S. application Ser. No. 17/879,499 filed on Aug. 2, 2022, U.S. application Ser. No. 17/686,790, filed on Mar. 4, 2022, U.S. application Ser. No. 17/887,849 filed on Aug. 15, 2022, U.S. application Ser. No. 17/851,821, filed Jun. 28, 2022, U.S. patent application Ser. No. 17/900,570, filed Aug. 31, 2022, U.S. application Ser. No. 17/946,479 filed on Aug. 16, 2022, U.S. application Ser. No. 18/095,801 filed on Jan. 11, 2023, U.S. patent application Ser. No. 18/098,612, filed Jan. 18, 2022, and U.S. application Ser. No. 18/117,288 filed on Mar. 3, 2023.

FIELD OF THE INVENTION

The present invention relates generally to the transport of sampled signals over electromagnetic pathways. More specifically, the present invention relates to the transport of video signals using encoding and orthogonal frequency divisional multiplexing (OFDM) or OFDM by itself.

BACKGROUND OF THE INVENTION

Image sensors, display panels, and video processors are continually racing to achieve larger formats, greater color depth, higher frame rates, and higher resolutions. Video transport (whether within a sensor, device or display set, within a constructed environment that surrounds people, within a vehicle, or over much longer distances) necessarily involves the transport of media signals (such as video signals) over one or more electromagnetic (EM) pathways.

Due to such phenomena as attenuation, reflections due to impedance mismatches, and impinging aggressor signals, every EM path degrades EM signals that propagate through it, in the sense that measurements of an EM signal taken at a receiving terminal are certain to differ to some extent from the levels, properties, parameters, etc. made available at a corresponding transmitting terminal. Therefore, every EM path may be considered an imperfect electromagnetic propagation pathway. The quality of any given EM path is characterized by the comparison of the levels measured at the receiving terminal after conveyance through the EM path to the levels made available at the transmitter.

U.S. Pat. No. 10,158,396 discloses systems and techniques for encoding analog or digital samples and transmitting those encoded samples over an electromagnetic pathway for the corresponding decoding and use of those samples. U.S. application Ser. No. 16/494,901 discloses systems and techniques for distributing and transmitting encoded samples over multiple electromagnetic pathways for eventual decoding and use, while U.S. application No. 63/232,486 discloses systems and techniques for the distribution, staging and permutation of samples before their encoding and transmission over one or more electromagnetic pathways (followed by the corresponding decoding, staging, permutation and collection of those samples). U.S. application Ser. No. 17/686,790 discloses a particular embodiment for the construction of a transmitter with encoders (and a receiver with decoders) for implementing transmission of encoded analog or digital samples over electromagnetic pathways. U.S. application Nos. 63/317,746 and 63/280,017 disclose respective transmitters and receivers within a display unit that use the SSVT technique to transport video.

Given that electromagnetic pathways are inherently imperfect and recognizing that the above disclosures use a particular technique for transmitting samples over an electromagnetic pathway, additional techniques are desirable to improve upon the quality of the electromagnetic signals sent from a transmitting terminal to a receiving terminal.

SUMMARY OF THE INVENTION

To achieve the foregoing, and in accordance with the purpose of the present invention, techniques are disclosed that use an improvement of orthogonal frequency divisional multiplexing (OFDM) to modulate optionally encoded analog or digital samples for transmission from a transmitting terminal to a receiving terminal, and to demodulate a received OFDM signal into analog or digital samples. The input samples into an OFDM transmitter may be analog or digital and may be encoded or not.

In one embodiment an orthogonal frequency divisional multiplexing (OFDM) transmitter for transmitting digital levels separates an input digital level into I and Q components. An encoder continuously encodes vectors of N samples using N codes of length L to produce the digital levels.

In a second embodiment, an orthogonal frequency divisional multiplexing (OFDM) receiver receives an OFDM modulated signal and outputs digital levels. A decoder continuously decodes L levels using N codes of length L to produce vectors of N samples.

In a third embodiment an orthogonal frequency divisional multiplexing (OFDM) transmitter for transmitting analog levels uses a pair of input analog levels as the I and Q components. An encoder continuously encodes vectors of N samples using N codes of length L to produce the analog levels.

In a fourth embodiment an orthogonal frequency divisional multiplexing (OFDM) receiver receives an OFDM modulated signal and outputs analog levels. A decoder continuously decodes L levels using N codes of length L to produce vectors of N samples.

In a fifth embodiment an orthogonal frequency divisional multiplexing (OFDM) transmitter for transmitting digital video samples maps input digital samples into I and Q components and outputs a signal using OFDM representing the video samples.

In a sixth embodiment, an orthogonal frequency divisional multiplexing (OFDM) receiver receives an OFDM modulated signal and outputs digital samples. Reverse mapping maps I and Q components to the stream of output digital samples.

In a seventh embodiment an orthogonal frequency divisional multiplexing (OFDM) transmitter for transmitting analog video samples maps input analog samples into I and Q components and outputs a signal using OFDM representing the video samples.

In an eight embodiment, an orthogonal frequency divisional multiplexing (OFDM) receiver receives an OFDM modulated signal and outputs analog samples. Circuitry combines I and Q components to produce a stream of output analog samples.

In a ninth embodiment, a source driver of a display unit includes a receiver that receives analog video samples, registers, and amplifiers that deliver the samples to columns of a display panel. The source driver does not include a DAC.

In a tenth embodiment, an apparatus includes a distributor that distributes digital video samples to OFDM transmitters, each transmitter mapping the digital samples to a constellation and producing and OFDM signal.

In an eleventh embodiment, a video transmitter includes a distributor that distributes digital video samples to multiple pathways, each pathway including a digital-to-analog converter followed by an OFDM transmitter.

In a twelfth embodiment, a video receiver includes an OFDM receiver that outputs analog video samples, followed by collector that outputs the samples to a plurality of column drivers.

In a thirteenth embodiment, a video transmitter includes a distributor that distributes digital video samples into input vectors and outputs samples from each input vector into an OFDM transmitter.

In a fourteenth embodiment, a video receiver includes an OFDM receiver that outputs digital video samples, followed by a digital-to-analog converter and then a collector that outputs analog video samples to a plurality of column drivers.

In a fifteenth embodiment, a video transmitter includes a distributor that distributes analog video samples into input vectors and outputs samples from each input vector into an OFDM transmitter.

The invention is especially applicable to displays used in computer systems, televisions, monitors, game displays, home theater displays, retail signage, outdoor signage, etc. Embodiments of the invention are also applicable to video transport within vehicles such as within automobiles, trains, airplanes, ships, etc., and applies not only to video transport from a transmitter to displays or monitors of the vehicle, but also to video transport within such a display or monitor. In a particular embodiment, the invention is useful within a display unit where it is used to transmit and receive video signals. By way of example, a transmitter of the invention may be used to implement the transmitter as described in U.S. application No. 63/317,746, and a receiver of the invention may be used to implement the receiver as described in U.S. application No. 63/280,017.

BRIEF DESCRIPTION OF THE DRAWINGS

The invention, together with further advantages thereof, may best be understood by reference to the following description taken in conjunction with the accompanying drawings in which:

FIG. 4A illustrates another embodiment of how digital samples may be mapped within mapping circuitry FIG. 4B shows a graph showing how values represent a point on the complex QAM plane.

DETAILED DESCRIPTION OF THE INVENTION

Figure 1:
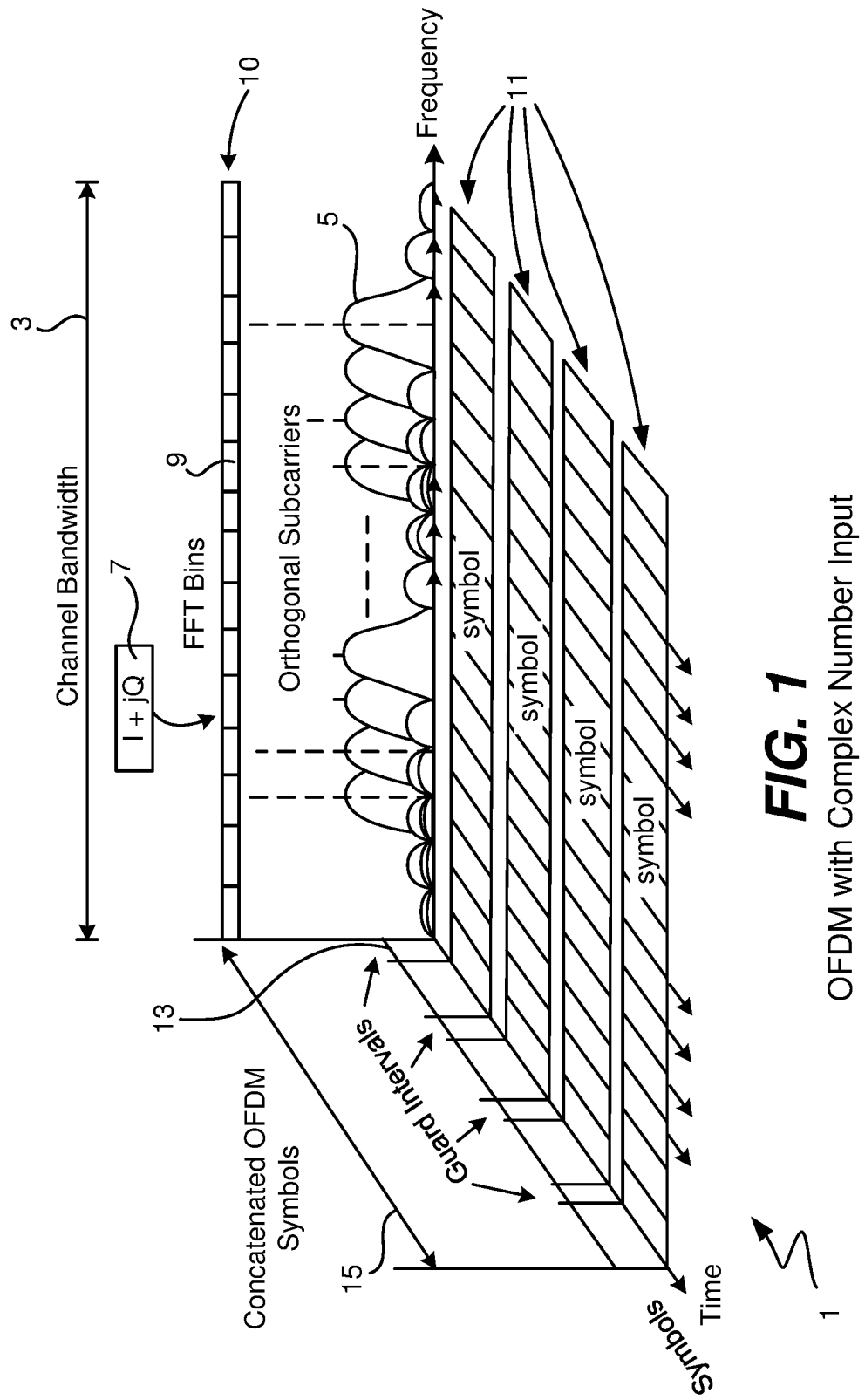
FIG. 1 illustrates an OFDM scheme for transmitting data using complex number input.

As mentioned earlier, various embodiments of the present invention disclose that an analog signal be used to transport video information either locally (e.g., within a display unit) or over longer distances. For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals while "digital" signals are discrete-time, discrete-amplitude EM signals. Discrete-time, continuous-amplitude EM signals may be referred to as "sampled analog" signals (although the signal need not necessarily be sampled—the discrete-time values may be inherent at their source), "discrete-time analog" signals, "clocked-analog" or even as "pulsatile" signals. Continuous-time, discrete-amplitude EM signals may be referred to as a "discrete-amplitude analog" signal, or even as "neuronal" signals. The analog levels, analog samples and analog video samples referred to herein are preferably discrete-time analog signals.

As mentioned above, electromagnetic pathways are inherently imperfect. In order to identify how the quality of an electromagnetic signal degrades when transported from a transmitter to a receiver in the context of transmitting encoded analog or digital samples, and to improve upon that transport, the inventors of the present disclosure have made the following realizations.

Important in the transmission of encoded analog or digital samples is the signal-to-noise ratio (SNR) of the electromagnetic signal, especially over an electromagnetic path such as a cable. And, various degradation mechanisms have been identified that contribute to SNR degradation—crosstalk, attenuation, thermal noise and nonlinear distortion. With regard to crosstalk, especially over shielded cables, it is recognized that far-side crosstalk (FEXT) is especially problematic and is perceived as noise in a receiver. Further, and again with respect to cables such as Cat-5, Cat-6 or Cat-7, it is recognized that the SNR is frequency-dependent and becomes drastically lower at higher frequencies and at greater cable lengths. At these higher frequencies and longer cable lengths the signal becomes attenuated while crosstalk increases, both lowering the SNR. A second mechanism that degrades the SNR of an electromagnetic signal is thermal noise. Due to these effects, the attenuation of a signal in a cable brings the signal closer to a constant noise floor, again resulting in SNR degradation. A third mechanism that results in SNR degradation is nonlinear distortion. It is further realized that SNR degradation is also present in other channels such as wireless (radio links, e.g., point-to-point backhaul, LTE, Wi-Fi, etc.), optical, etc.

Thus, knowing that the SNR is important in transporting samples, the inventors have performed an analysis of possible modulation techniques for transporting those samples that would take advantage of the resiliency provided by SSVT to affect greater information density. One such modulation technique is orthogonal frequency division modulation (OFDM). Considering the encoding and transmission of digital or analog samples, it is realized that OFDM in combination with SSVT will provide increased information density while using the increased electrical resiliency. Therefore, the inventors have concluded that integrating OFDM with the encoding and transmission of analog and digital samples and improving upon OFDM will provide important advantages.

In particular, OFDM combined with an SSVT output will have advantages when using electromagnetic pathways such as cables and other media that have strong path length dependencies and non-linearities, in optical fiber, and in noisy environments and systems requiring greater usage of the available bandwidths. Moreover, in the absence of a noisy or bad environment, increased performance due to an OFDM/SSVT combination directly translates to longer range in any such more ideal environment.

Further, it is realized that OFDM has been used in many high data rate wireless systems (and in other EM pathways) because of the many advantages it provides, and that an OFDM/SSVT combination will also provide these advantages, which include the following:

Immunity to selective fading: OFDM is more resistant to frequency selective fading than single carrier systems because it divides the overall channel into multiple narrowband signals that are affected individually as flat fading sub-channels.

Resilience to interference: Interference appearing on a channel may be bandwidth limited, and in this way will not affect all the sub-channels. This means that not all data is lost.

Spectrum efficiency: OFDM makes efficient use of the available spectrum.

Resilient to ISI: OFDM is very resilient to inter-symbol and inter-frame interference. This results from the low data rate on each of the subchannels.

Resilient to narrow-band effects: Using adequate channel coding and interleaving it is possible to recover symbols lost due to the frequency selectivity of the channel and narrow band interference. Not all the data is lost.

Simpler channel equalization: One of the issues with CDMA systems was the complexity of the channel equalization which had to be applied across the whole channel. An advantage of OFDM is that using multiple sub-channels, the channel equalization becomes much simpler.

As described in greater detail below, it is further realized that video transport using an improved OFDM technique (without SSVT input) has advantages in various embodiments.

OFDM Transmitter with Complex Number Input

FIG. 1 illustrates an OFDM scheme 1 for transmitting data using complex number input. Other schemes for implementing an OFDM transmitter may also be used. As known in the art, orthogonal frequency-division multiplexing (OFDM) is a multi-carrier modulation technique that uses multiple subcarriers within a channel. Each subcarrier will be modulated with a particular modulation scheme. OFDM is a type of traditional frequency division multiplexing (FDM) but differs in that the multiple subcarriers are orthogonal to one another. Typically, an OFDM transmitter outputs complex numbers from its IFFT, but the present invention also contemplates a particular OFDM scheme having real number output from its inverse FFT which is described in more detail below.

Not shown in FIG. 1 is the input to the transmitter which may be a digital input of a bit stream or an analog input of analog levels, both described in more detail below. In the case of digital input, the input bit stream may be encoded, interleaved and grouped before being mapped onto a particular constellation to produce a stream of complex numbers; a digital modulation scheme such as BPSK, QPSK, or QAM may be used, although QAM is preferred because of its better performance. As explained in greater detail below, embodiments disclose novel techniques for mapping digital output levels or analog output levels from an encoder into a stream of complex numbers 7 for use by an OFDM transmitter. The encoder has encoded digital or analog samples (e.g., video samples).

In another embodiment, for fixed channels that do not change over time (or not frequently), a technique referred to as "bin loading" may also be used. For digital modulations, attenuated bins (due to the channel) are either nulled or mapped with a lower modulation order (e.g., QPSK rather than 64QAM, for example). Bin loading requires a negotiation period between the receiver and transmitter; the receiver updates the transmitter with the state of each bin in the channel estimation.

As shown in FIG. 1, the OFDM scheme 1 has a particular channel bandwidth 3 and makes use of any number of K orthogonal subcarriers 5, which may overlap. Input to an OFDM transmitter will be a stream of complex numbers 7 (whose generation is described in more detail below) which are used to load any number of FFT bins 9, i.e., one complex number per bin. Each of these complex numbers (or source symbols) is treated as being in the frequency domain and will be input to the inverse fast Fourier transform (IFFT) block 10 in order to transform that data into the time domain. Thus, each complex number will specify both the amplitude and phase for the sinusoid of a particular subcarrier. The number of orthogonal subcarriers used, and hence the number of bins 9, will depend upon a particular implementation.

Typically, not all bins will contain input data as some bins are pilot bins, and the zero bin does not contain input data. In addition, some bins at the high and low portions of the spectrum are also nulled and are called guard bins. These guard bins are meant to reduce interference with adjacent channels. Using today's technology, especially lower-phase noise frequency sources, the number of guard bins is about four on each side. Normally, the IFFT size will be a power of 2 (e.g., 64, 128, 256, etc.), and for reduced implementation complexity will be a power of 4 (64, 256, 1024, etc.). As mentioned, the zero subcarrier (bin), which is the center frequency (or DC) is not used and is always nulled. Pilot bins may be added for phase tracking or for channel estimation tracking during reception (if the channel is not fixed). In common practice with other standards which assume a low fading channel (a pseudo fixed channel), a pilot bin may be assigned per 15 data bins. For fixed channels, pilot bins may be redundant and not used at all.

Once all bins of IFFT block 10 have been loaded (each with a complex number from the input stream), then an inverse FFT takes this frequency domain input data (i.e., the complex numbers representing the subcarriers) and converts it to time domain output data, i.e., each subcarrier is independently modulated with its corresponding complex data. Each block 11 of K output samples is considered a single OFDM symbol. Each OFDM symbol 11 may be clocked out at a particular rate, thus providing an OFDM waveform of a particular duration. Once in the time domain, a guard interval 13 of a particular duration is typically added between each OFDM symbol (typically added to the beginning of each waveform), thus preventing interference between symbols at the receiver. An OFDM symbol thus consists of the IFFT OFDM waveform plus the guard interval.

Further processing of each OFDM symbol may be performed and the above process is repeated to continuously create OFDM symbols 11 from the input data. Before transmission, multiple OFDM symbols may be concatenated 15, and a preamble is added (to help the receiver synchronize due to imperfections during transmission) in order to form a single time-domain burst signal. This burst signal (or component baseband signal) may then be used to modulate a main RF carrier (for example) for transmission to an OFDM receiver as an OFDM burst, as is known in the art. As is known in the art, at the OFDM receiver an FFT is performed on the received OFDM symbols to bring them back into the frequency domain.

To recover the original data input into the OFDM transmitter (digital or analog output levels from an encoder) the reverse of the novel mapping techniques is performed as discussed in more detail below. Decoding is then performed on the digital or analog levels to recover the original digital or analog samples (e.g., video samples) that had been input into the encoder.

The number of concatenated OFDM symbols will depend upon system requirements, for example, how fast the system needs to re-synchronize to the stream if the connection is lost. If it is required to lock quickly, the preamble may appear more often. If the receiver is required to lock on the first preamble it receives, the preamble should be selected to have a good auto-correlation peak; otherwise, a shorter and simpler preamble can be used.

Typically, in order to calculate a single output of an IFFT all input samples to the IFFT are used. Each output is the sum of all samples at the input, each multiplied by a different factor which depends on input/output indexes. Thus, calculating the K output samples uses all K bin components. After filling the K input bins, they are all used to calculate the time domain K output samples. The K output samples represent the signal waveform for K consecutive samples, each output being a complex value (in the case of the complex IFFT; a real IFFT is discussed below). These K output samples together are called an OFDM symbol.

Typically, the cyclic prefix (or guard interval) copies M samples from the end of the K IFFT output samples to the beginning of the OFDM symbol in order to cancel intersymbol interference. In most cases, the K IFFT output samples plus the M guard interval samples are called the OFDM symbol instead of only the K IFFT output samples.

OFDM Transmitter with Digital Input Mapped to Complex Numbers

The below embodiments use SSVT followed by OFDM with either digital samples or analog samples being input into an OFDM transmitter (e.g., FIGS. 2 and 6). This type of video transport may be used sending video over long distances to a display, television or monitor, or, may be used inside of a display to send video from an input of the display to the source drivers.

Figure 2:
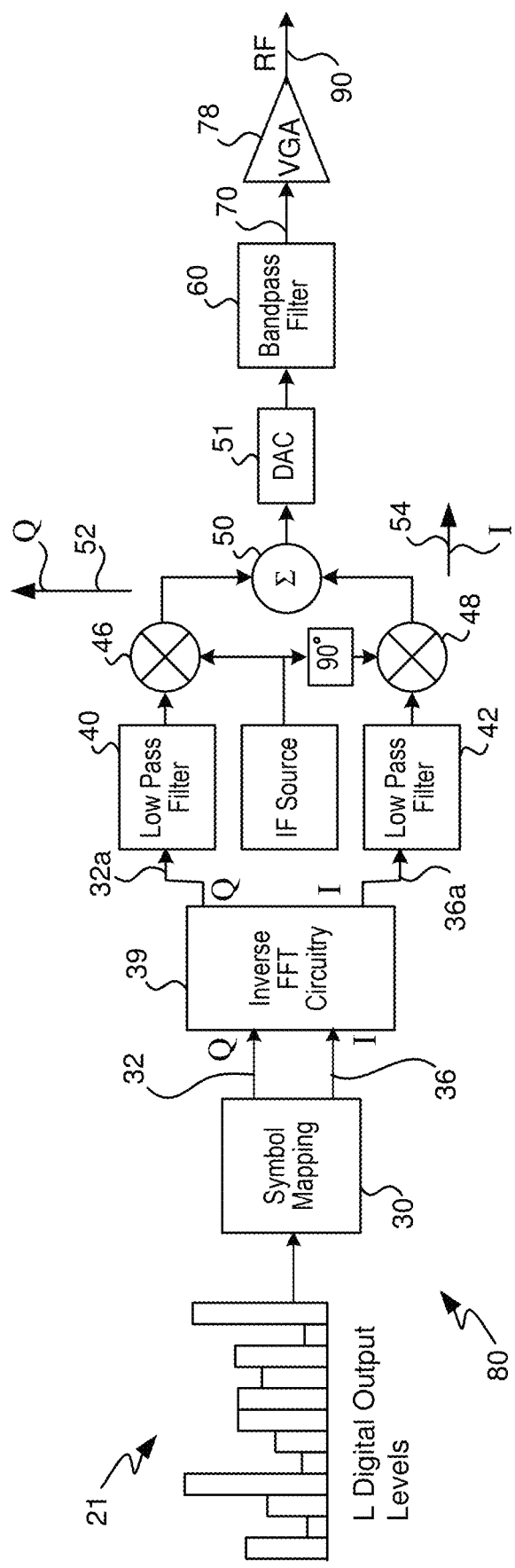
FIG. 2 illustrates an example OFDM transmitter.

FIG. 2 illustrates an improved OFDM transmitter 80 with digital input. As shown, output from an encoder as herein described are L digital output levels 21 (e.g., levels 161 of FIG. 8) which are input into a symbol mapping unit 30. Any of the techniques herein described may be used to map an input digital level into a complex number, namely Q and I components 32 and 36.

In one example, a mapping technique from quadrature amplitude modulation (QAM) is used to produce the complex numbers used for modulation. As is known in the art, a sinusoid with angle modulation can be synthesized from two amplitude-modulated sinusoids that are offset in phase by one-quarter cycle (pi/2 radians); these amplitude-modulated sinusoids are known as the in-phase (I) and quadrature (Q) components. The digital levels 21 are received one at a time as a bit stream and are first input into a serial-to-parallel converter (not shown) which converts the bit stream into parallel groups of bits representing digital values, e.g., if the digital values to be modulated are four bits long, then converter converts the bit stream into groups of four bits each. Each group is then input to mapping unit 30 in a particular way depending upon the mapping technique used. In this example, there is a single mapping unit that inputs a digital value and outputs the I and Q values into the inverse FFT circuitry 39.

The symbol mapping unit 30 produces the Q component 32 and I component 36; these two components representing a complex number are then input into the inverse FFT circuitry block 39 to be processed by an IFFT as discussed above. Not shown is a guard interval (or, cyclic prefix) insertion block which may be located within block 39 or immediately after. Thus, IFFT circuitry 39 produces output samples, i.e., each a complex number having Q and I components 32a and 36a which are input into low pass filters 40 and 42.

The Q and I components (I and Q being real signals, the pair {I,Q} being a complex signal) are each passed through a low pass filter 40, 42 to limit the signal bandwidth. Next, IF source 44 (basically a numerically-controlled oscillator) takes the in-phase component and the quadrature component and multiplies each signal by its amplitude, placing the quadrature component 90° out of phase, and then adding both together in a summer 50. The output of summer 50 will be a real signal representing the original digital value input into the transmitter; DAC 51 converts that digital value to analog. A bandpass filter 60 may be used to filter unwanted spurs and harmonics, resulting signal 70 may be fed into a variable gain amplifier (VGA) 78 to output the OFDM signal 90 representing levels 21. In another more conventional implementation (not shown), referring again to FIG. 2, there will be DACs on both the I and Q paths (immediately before low pass filters 42 and 40) and the subsequent blocks are implemented in analog and DAC 51 is not required. This implementation requires a much lower sampling rate and may use less expensive components. In general, amplifier 78 (and amplifiers 680, 748, 798 below) is used but need not be a VGA. Also, although the output is shown as an RF signal 90 (or 690, 749, 799 below), the output signal may be any electromagnetic signal that propagates in wire, a cable, optical fiber, etc.

As mentioned above, it is realized that QAM may be used to modulate the subcarriers using various improvements to the mapping of the OFDM transmitter as discussed below. Depending upon the implementation, QAM constellations of different sizes may be used. In one example a 16-QAM constellation may be used in conjunction with transmitter 80 to map digital values to complex numbers. In a 16-QAM constellation digital values are four bits each; mapping each digital value using a constellation results in a vector having an amplitude and a phase. Of course, other constellations of smaller or larger sizes may also be used. By way of example, a 1024-QAM constellation may be used; each of the digital values within this constellation will be 10 bits long. Most common QAM constellation sizes can be calculated as $4^n$: 4-QAM, 16-QAM, 64-QAM, 256-QAM, 1024-QAM and 4096-QAM. Higher QAM constellation sizes are rarely used. Other $2^n$ QAM constellations do exist but are more complicated to encode.

In other embodiments, the OFDM transmitter may be implemented in different manners. By way of example, instead of a single mapping unit 30, there may be two mapping units 30a and 30b (each an M-array PAM). Each group of bits representing a digital value is split, e.g., two bits being routed to unit 30a to produce the Q component and two bits being routed to unit 30b to produce the I component. And, the inverse FFT circuitry 39 may output Q and I components 32a and 36a into interpolation filters that are used to increase the sampling rate of the input signal. Two frequency conversion components receive the output from each interpolation filter and provide an upconverter of frequency from a baseband signal. An NCO (numerically-controlled oscillator, in place of the IF source) interacts with the conversion components to create the in-phase and quadrature components, which are summed together by a summer in order to produce a real output signal followed by a DAC, filter and VGA. These components may be embodied within a MAX5857 RF DAC (includes a clock multiplying PLL/VCO and a 14-bit RF DAC core). A real sample is input every clock cycle having the amplitude and phase derived from the constellation map. This implementation assumes that the DAC is clocked at a high frequency which is higher or close to the RF frequency. In an alternative, instead of a single DAC, there will be two DACs one each on the I and Q paths before the interpolation filters. The implementation described in this paragraph may be preferred over that of FIG. 2 as it is a cleaner implementation.

Mapping Digital Values to Complex Numbers

The mapping of FIG. 2 in unit 30 performs symbol mapping and mapping may be performed in any suitable manner using circuit techniques known in the art. Symbol mapping 30 may also include mapping circuitry that maps incoming digital levels in an improved manner as described below. In one embodiment, for each digital output level from an encoder, the lower half bits of each output level are sent via the Q path while the upper half of the bits from each output level are sent via the I path. In another embodiment, every odd-numbered output level is sent via the Q path while every even-numbered output level is sent via the I path. In another embodiment, if each digital output level is 12 bits long and a 16-QAM is used, then that value is divided up into three groups of four bits each, each group divided into I and Q values of two bits each; other divisions may also be used. In another mapping embodiment gray coding may be used. For digital data, gray coding is used to lower the probability of multiple bits errors. Gray coding implies that coding of neighboring constellation points will differ by only one bit.

In one preferred embodiment, the most significant bits (MSBs) of each digital output level from an encoder are divided between and become the MSBs of the I and the Q paths while the least significant bits (LSB's) of each digital output level are divided between and become the LSBs of the I and the Q paths. By way of example, considering that a digital output level is the four-bit binary string [ABCD], each of the letters A, B, C, D representing a single binary digit (e.g., a "1" or a "0"), AB representing the most significant bits and CD representing the least significant bits, these four bits will be distributed as follows between the I and the Q paths: I=AC, Q=BD. Thus, the most significant bits of the digital output level become the most significant bits on the I and the Q paths while the least significant bits of the digital output level become the least significant bits on the I and Q path.

The reason for this distribution is due to the realization that if there is noise or other disturbance along a transmission medium that the received OFDM signal may be slightly distorted and the least significant bits may be lost. But, as the digital output levels of the present invention may represent a media signal (e.g., pixel values from a camera source), it is not strictly necessary that each and every bit be perfectly preserved from transmitter to receiver. Contrast that with transmission of digital data (such as a document) between computers where every bit transmitted must be perfectly preserved and sophisticated error detection is required. In other words, the OFDM receiver is less sensitive to errors on the LSBs than to errors on the MSBs. Thus, this distribution provides better protection for the MSBs compared to the LSBs. Unlike digital data transmission where each bit is critical, not all bits in this distribution have the same weight; the closer the bit location is to the MSB the more important it is. Therefore, by dividing the MSB's and the LSB's of each digital output level between the I and the Q paths, if the received OFDM signal is distorted and received incorrectly, it is only the LSB's of the original digital output level that will be lost. Loss of LSBs in a received media signal is not catastrophic.

Figure 3A:
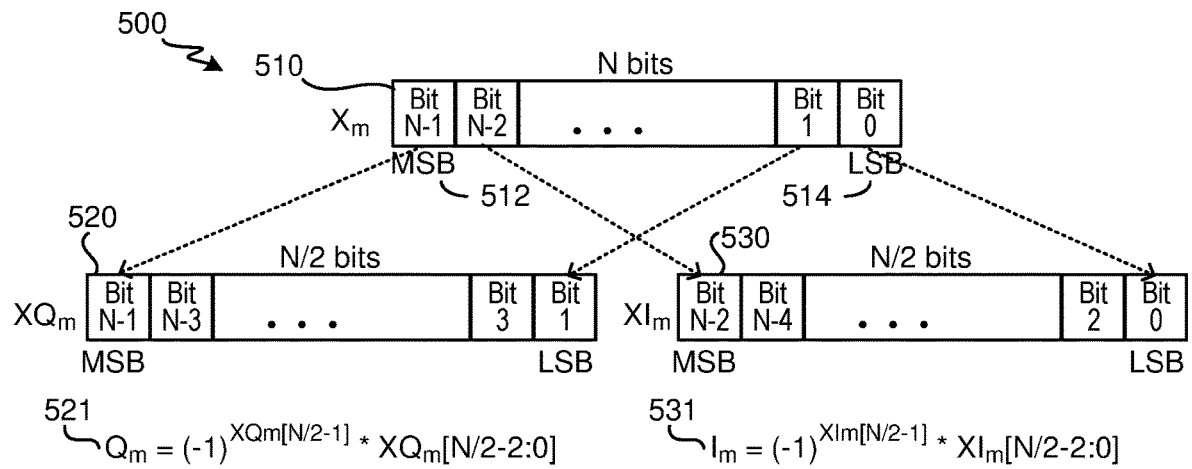
FIG. 3A illustrates an embodiment of how division of MSB's and LSB's may occur within mapping circuitry.

FIG. 3A illustrates an embodiment 500 of how this division of MSB's and LSB's may occur within mapping circuitry. Assuming a digital output level $X_m$ 510 is represented by N bits, 510 having any number of MSB bits 512 and any number of LSB bits 514, the MSB bits being half or roughly half the total number of bits. Then, assuming that N is even, the digital output level can be divided to two digital values, $XI_m$ 530 and $XQ_m$ 520, by selecting the even and odd bits, the even-numbered bits (including 0) assigned to value 530 and the odd-numbered bits assigned to value 520. Each one of the new digital values, $XI_m$ and $XQ_m$, may further be converted into a binary representation of a signed value where the MSB of each value becomes the sign of the value and the remaining bits become the amplitude of the value. The resulting values 531 and 521 are then used as the values for the I and Q path respectively in the complex QAM plane. Of course, the even-numbered bits may be assigned to value 520 and the odd-numbered bits assigned to value 530.

Even though in the above scheme the MSB for each digital value becomes the sign bit, the value represented by the MSB is not lost. The idea is that values "closer" to each other, for example values of −1 and 0, are mapped to very close constellation points. Even though the MSB is not the same for both values, if there is a mistake between the two values there will only be an error of "1" which is the smallest possible error for an "analog" sample.

Other techniques for creating signed values from values 520 and 530 are also possible. By way of example, another way to map a value to a constellation point instead of mapping the MSB to the sign bit may be performed by taking an unsigned value and subtracting an offset which is the median value between the minimum and maximum value.

Figure 3B:
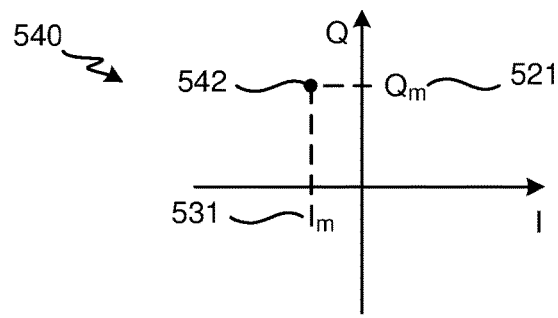
FIG. 3B shows a graph showing how values represent a point on the complex QAM plane.

FIG. 3B shows a graph 540 showing how values 521 and 531 represent point 542 on the complex QAM plane.

Figure 3C:
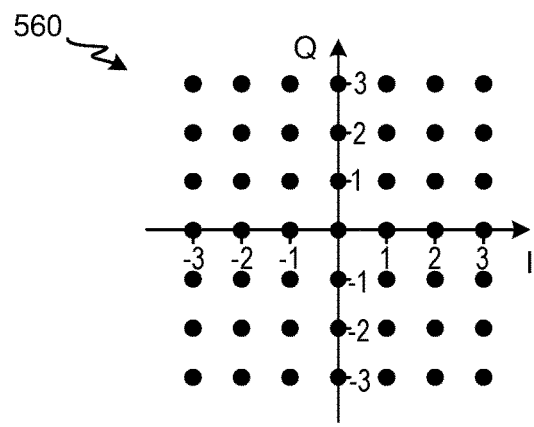
FIG. 3C shows an example QAM constellation.

FIG. 3C shows an example QAM constellation 560. Note that since the number of bits used to represent XIm and XQm is finite, the number of actual values Im and Qm may also be finite. In this example, the original digital output level 510 has 6 bits, thus there are 3 bits each representing Im and Qm, the first bit being the sign bit, meaning that values for each range from −3 to 3 as shown in the constellation. This constellation may thus be used to map XIm and XQm into I and Q values for the I and Q paths of an OFDM transmitter.

FIG. 4A illustrates another embodiment of how digital output levels may be mapped within mapping circuitry. Here, the even and odd digital levels $X_{m-1}$ and $X_m$, are each mapped directly to the I and Q components using the same binary representation to map the digital levels to the QAM plane. Again, the MSB of each is treated as a sign bit. Assuming an input digital level $X_m$ 570 and subsequent digital level $X_{m-1}$ 572 are each represented by N bits. The resulting values 581 and 583 are then used as the values for the I and Q path respectively in the complex QAM plane.

FIG. 4B shows a graph 590 showing how values 581 and 583 represent point 592 on the complex QAM plane.

OFDM Transmitter with Analog Input Mapped to Complex Numbers

Figure 8:
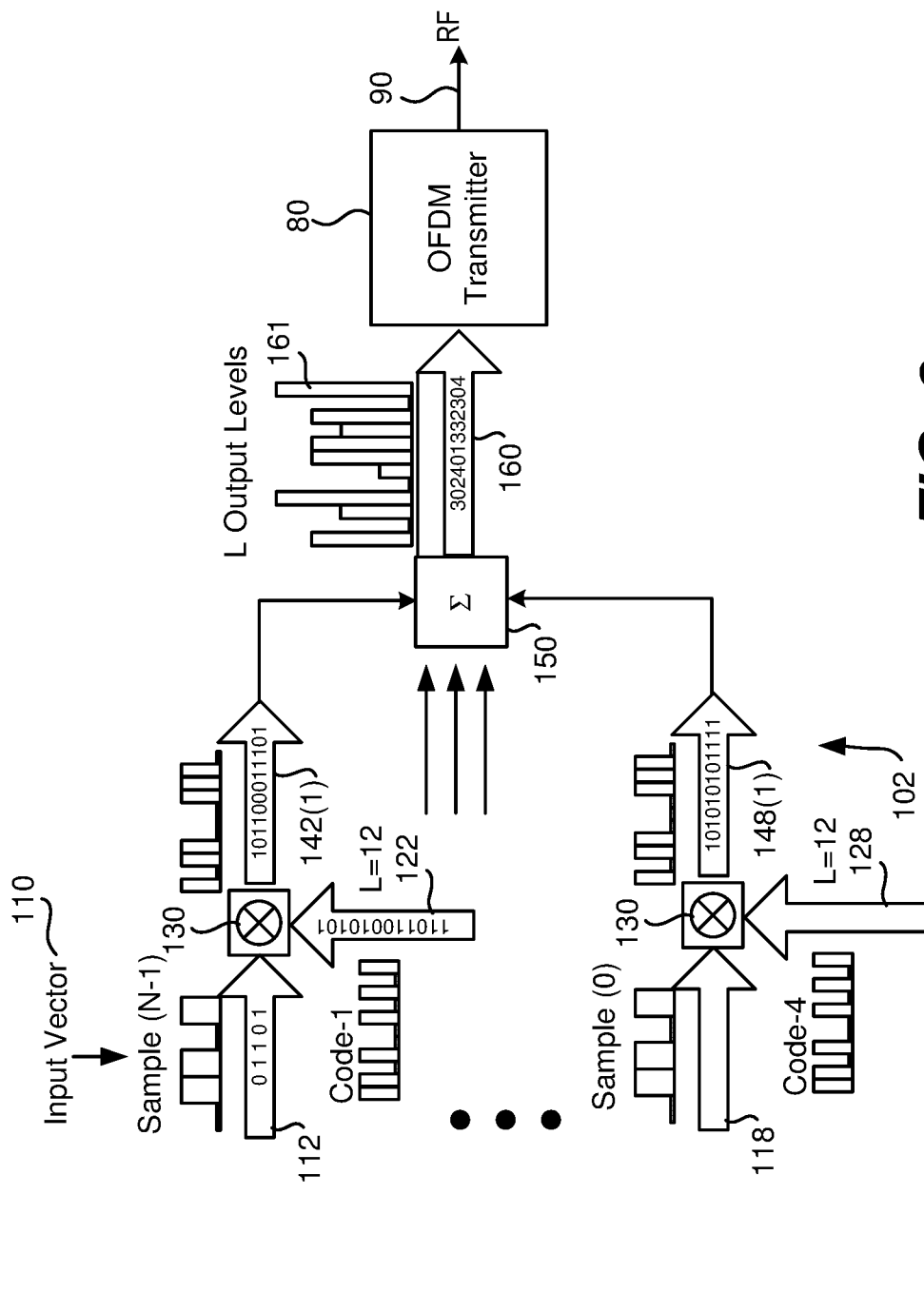
FIG. 8 illustrates digital encoding of sampled signals before input into an OFDM transmitter.
Figure 14:
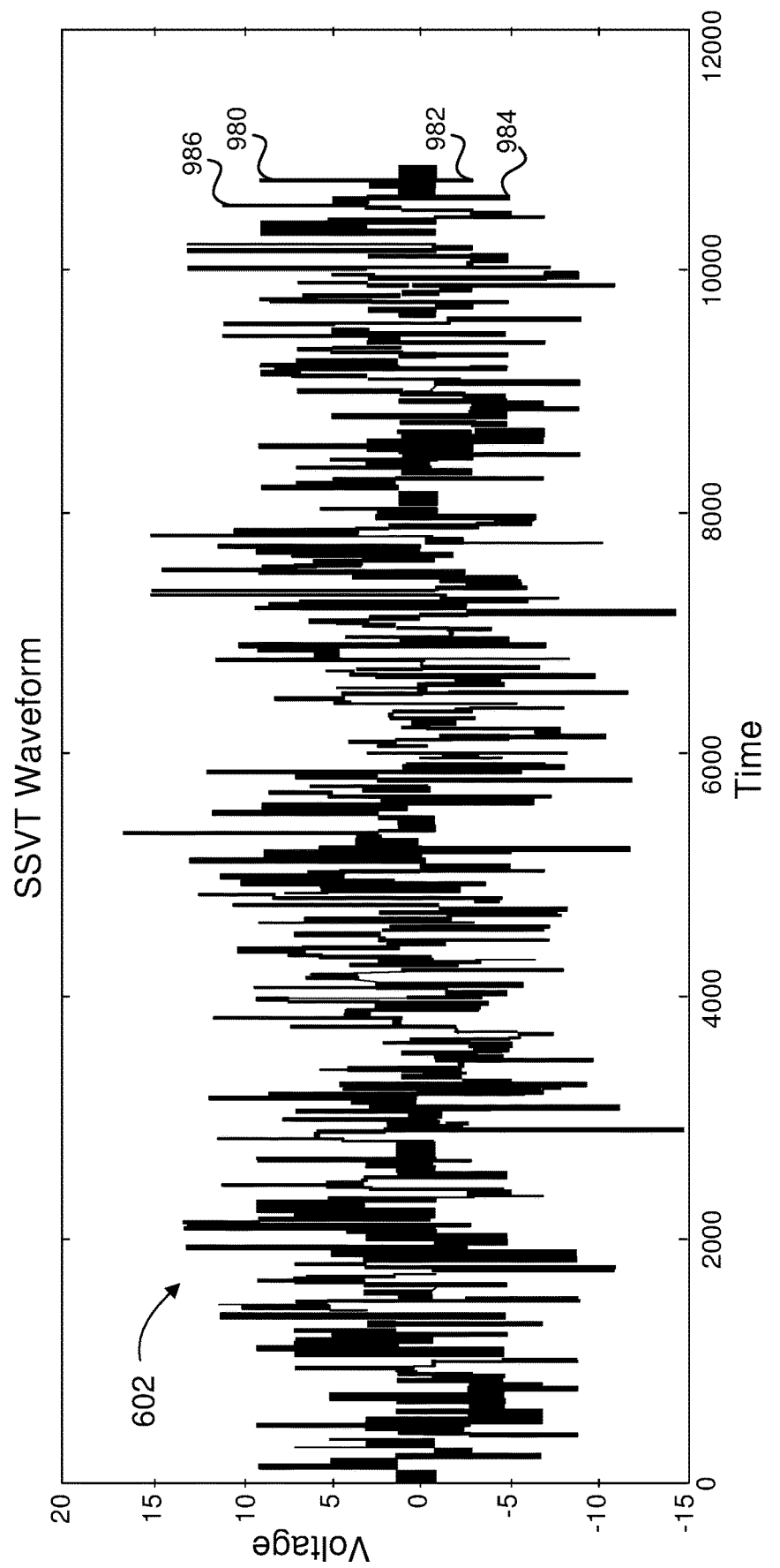
FIG. 14 shows a simulation of an SSVT waveform sent via an electromagnetic pathway.

As mentioned earlier, and as described herein, instead of encoding digital samples 112 to produce digital output levels 161 as shown for example in FIG. 8, one embodiment of the invention may encode analog samples and produce analog output levels. Accordingly, the L output levels from an encoder will be analog levels and may appear, for example, as shown in the waveform of FIG. 14. This embodiment of the invention is also able to modulate and transmit these L analog output levels using an improvement to orthogonal frequency divisional multiplexing (OFDM) as will now be described. As shown in FIG. 14, the analog levels can be positive or negative. These levels do not change how the mapping is performed. In the digital case, the idea behind setting the MSB as the sign bit was exactly that, to map an "unsigned" value to a value that can be positive or negative.

Figure 5:
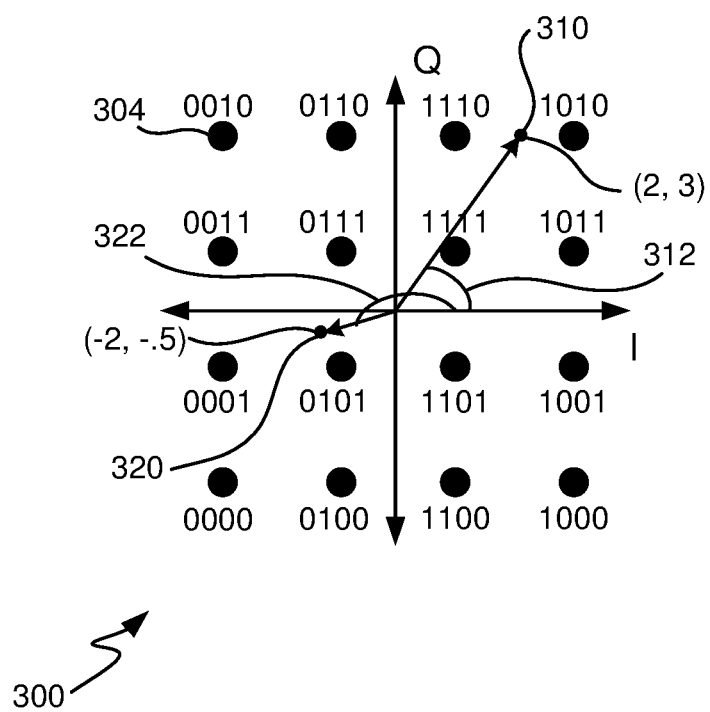
FIG. 5 illustrates a constellation mapping that is useful in describing how OFDM may use analog input levels.

FIG. 5 illustrates a constellation mapping 300 that is useful in describing how OFDM may use analog output levels from an encoder as inputs. Although this constellation still shows sixteen digital values 304, a mapping to these values is not used and these values are only shown to help the reader understand how analog levels are input. Although it is possible to convert a series of L analog output levels from an encoder into digital output levels and then input these digital levels into an OFDM transmitter as shown in FIG. 2, the embodiment now described uses the analog output levels directly. In other words, the analog output levels themselves can represent the in-phase (I) and out-of-phase (Q) components directly.

Figure 6:
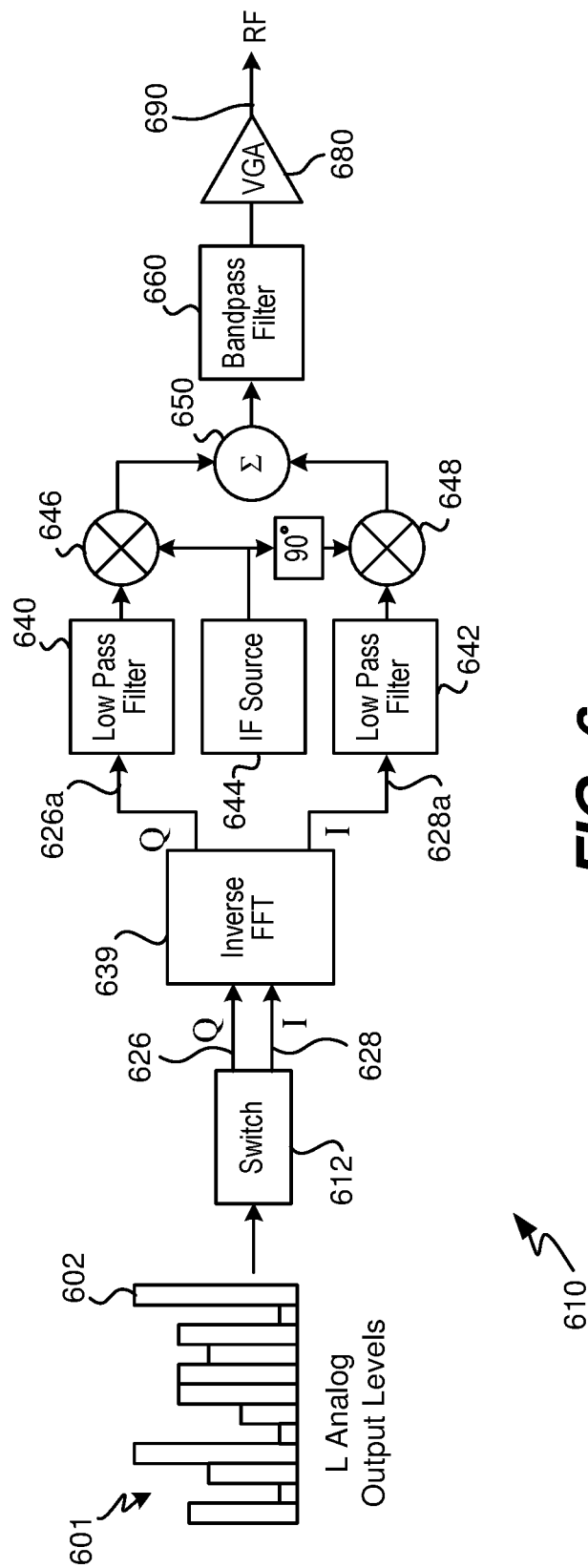
FIG. 6 illustrates an improved OFDM transmitter used with analog input values.

FIG. 6 illustrates an improved OFDM transmitter 610 with analog input. Shown are L analog output levels 601 from an encoder as herein described that are input into the transmitter 610.

Switch device 612 performs a sample and hold function to present alternately sampled (odd, even) of the received analog levels as time-aligned pairs down the Q path 626 and the I path 628 simultaneously. Thus, every two analog levels will produce an {I,Q} pair. This time alignment is necessary to ensure that the serially-presented analog levels modulate in the constellation simultaneously. Switch 612 may be any suitable hardware device used to select the destination of every level and to distribute these levels down either path. In a corresponding OFDM receiver, switch 612 is replaced by a combining device or combining circuitry that accepts the {I,Q} pairs from the FFT, combines each pair into a series of two analog levels and outputs a stream of analog levels corresponding to the analog levels received originally at the OFDM transmitter 610.

As mentioned, switch 612 produces the Q component 626 and the I component 628. These two components representing a complex number are then input into the inverse FFT circuitry block 639 to be processed by an IFFT as discussed above. Thus, each input into IFFT circuitry 639 also produces a complex number having Q and I components 626a and 628a which are input into low pass filters 640 and 642. The Q and I components (I and Q being real signals, the pair {I,Q} being a complex signal) are each passed through a low pass filter 640, 642 to limit the signal bandwidth. Next, IF source 644 (basically a numerically-controlled oscillator) takes the in-phase component and the quadrature component and multiplies each signal by its amplitude (this being the amplitude of the NCO and NCO shifted by 90 degrees), placing the quadrature component 900 out of phase, and then adding both together in a summer 650. The output of summer 650 will be a real signal (this real signal is also called the passband signal, which is the baseband signal shifted to the frequency of the NCO) representing the original two, consecutive analog levels input into the transmitter. A bandpass filter 660 may be used to filter unwanted spurs and harmonics, and finally a variable gain amplifier 680 is used to amplify and to output the OFDM signal 690, representing the original continuous input of analog output levels 601 from an encoder.

Before the inverse FFT block 639 one may add a series-to-parallel converter in order to align the L samples in parallel (i.e., thus producing I,Q inputs in parallel) and then perform the IFFT. After the IFFT, a parallel-to-series combiner is then used.

By way of example, consider that given a series of L analog output levels 601 the odd-numbered values will be placed upon the I path 628 and the even-numbered values will be placed upon the Q path 626. Of course, the odd-numbered values may be placed upon the Q path and the even-numbered values placed upon the I path. Thus, the I and Q components can each represent different analog output levels. Using output levels 601 as an example, the first analog output level 602 will be placed on the I path, the second level is placed on the Q path, the third level placed on the I path, etc. Returning to FIG. 5 in order to illustrate examples, consider that the first analog level is "2" and the second analog level is "3." Conceptually, these two values (I, Q) may be mapped to the point 310 producing the vector as shown having a specific amplitude and a phase 312. Next, consider that the third analog level is "-2" and that the fourth analog level is "-0.5". Similarly, these two levels may be mapped to the point 320 producing the vector as shown having a specific amplitude and a phase 322. In this fashion, a series of L analog output levels 601 may be input into an OFDM transmitter 610 in order to produce RF signal 690. Although output 690 is shown as an RF output, output over other types of electromagnetic pathways such as such as cable and optic fiber are also possible.

In fact, although FIG. 5 shows a QAM constellation for ease of explanation, mapping of each analog level into a specific digital constellation point (e.g., point 304) is not required because each analog level may be used directly to provide the I and Q values; the amplitude and phase of the resultant vector is determined using the I and Q values as shown.

Other techniques for directly mapping and using the analog output levels are also possible. In the case of analog samples, it is useful to minimize the amplitude of the error. Thus, mapping the even-numbered samples and odd-numbered samples to I and Q separately makes sense. Gray coding may not be suitable since for analog samples the lower bits of each sample have lower weight and are less important than the higher bits. Therefore, the odd-numbered levels may be sent down the Q path 626 and the even-numbered levels may be sent down the I path 628, or vice versa.

OFDM TRANSMITTER WITH DIGITAL OR ANALOG INPUT WITH REAL NUMBER OUTPUT FROM IFFT

The following embodiments generate real output values from the inverse FFT. In general, if you calculate the inverse FFT of N values, the output is complex. But, if one ensures that the input bins are conjugate-symmetric, the inverse FFT output will be real only, i.e., the I component will be 0 for all N output values. Basically, this is done by repeating N/2-1 complex number I and Q symbols using their conjugates in order to generate N real values at the output of the IFFT. This implementation does not require any NCO or frequency conversion since the output is real and it can be transmitted directly from the IFFT output. This is an advantage since one does not need an I/Q modulator that uses a carrier (NCO) in order to phase shift the I component (by 90 degrees) before it is summed with the Q component. This 90-degree shift (for the entire signal-spectrum) can only happen with this NCO+IQ mixers mechanism. These embodiments may be used in place of the embodiments above where the inverse FFT outputs a complex number.

It is realized it will be advantageous to generate the signal directly to the spectrum of a "baseband" channel, such as an Ethernet cable. An Ethernet cable (or a telephone line, for example) will pass signals starting from very low frequencies, maybe a few Hertz, and up to some finite frequency. Thus, the zero bin, also called the DC bin is the zero frequency (DC) and is not mapped to a center frequency in the available bandwidth. Further, frequency conversion is not required in this embodiment.

Figure 7A:
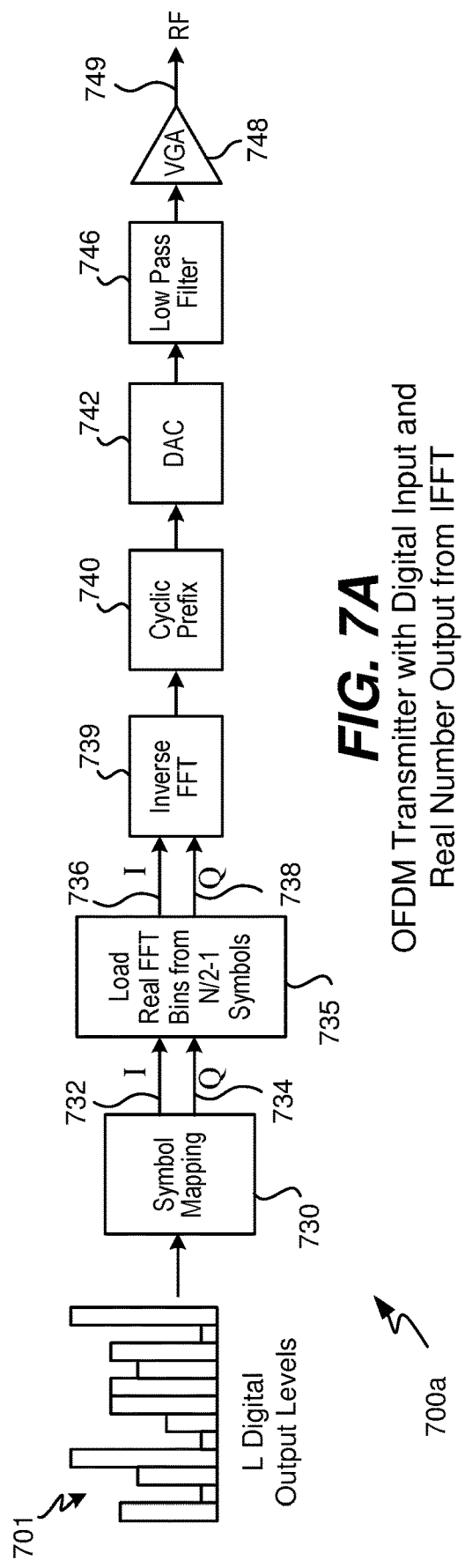
FIG. 7A illustrates an OFDM transmitter having digital input.

FIG. 7A illustrates an improved OFDM transmitter 700a with digital input. As shown, output from an encoder as herein described are L digital output levels 701 which are input into a symbol mapping unit 730. Any of the techniques herein described (such as QAM modulation) may be used to map an input digital level into a complex number, namely I and Q components 732 and 734. In block 735 the N real frequency FFT bins (corresponding to the N subcarrier frequencies) are loaded with N/2-1 of the I, Q symbol pairs received from unit 730.

Block 735 may be implemented as follows, assuming that there are N FFT bins corresponding to N sub-carrier symbols and numbered from 0 to N-1. First, collect N/2-1 symbols from either symbol mapping 730 (in the case of digital input) or from switch 780 (in the case of analog input); each symbol x(i) being an I, Q pair representing a complex number from the mapping or switch and where: x(i), i=[1:N/2-1]. Next, set FFT bin 0 to 0, and set FFT bins i=[1:N/2-1], to x(i). Next, set FFT bin N/2 to 0, and set FFT bins i=[N/2+1:N-1], to x*(N-i), where "*" is the complex conjugate operator, i.e., the bins immediately on either side of bin N/2 will hold complex conjugates of one another, e.g., if bin N/2-1 hold a+bi, then bin N/2+1 will hold a-bi, and the bins immediately on either side of these first immediate bins will hold complex conjugates, and so on. Accordingly, the inverse FFT of these bins will produce a real number output and not a complex number output.

Also, in many descriptions of the FFT the frequencies are indexed as positive and negative. Accordingly, the above description may be changed to be in line with those standards and may appear as follows: Next, set FFT bin 0 to 0, and set FFT bins i=[1:N/2-1], to x(i). Next, set FFT bins i=[-N/2+1:-1] to x*(-i), and bin -N/2 to 0, where "*" is the complex conjugate operator.

Block 735 results in the FFT bins holding N−2 of the I, Q pairs 736 and 738 as described above and which are input into the inverse FFT block 739 and processed using an inverse FFT as has been described above and as is known in an OFDM transmitter. Because of the duplication of the N/2−1 complex numbers in block 735 the inverse FFT 739 will produce a real number output and not a complex number. A cyclic prefix (or guard interval) is added in block 740, digital-to-analog conversion is performed in block 742, a low pass filter is applied in block 746, and finally the signal is amplified in VGA 748 to produce the final OFDM RF signal 749 for output along an electromagnetic pathway to an OFDM receiver. Blocks 739-748 may be implemented as known in the art. Although output 749 is shown as an RF output, output over other types of electromagnetic pathways such as cables and optic fiber are also possible.

Figure 7B:
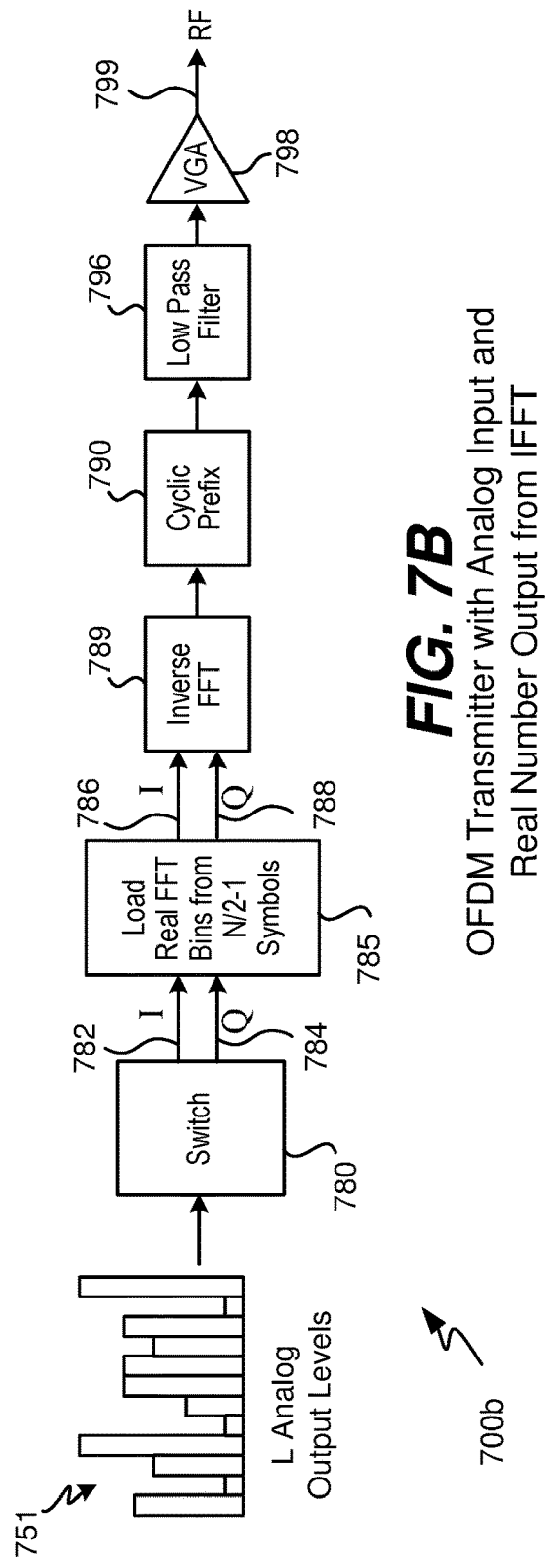
FIG. 7B illustrates an OFDM transmitter having analog input.

FIG. 7B illustrates an improved OFDM transmitter 700b with analog input. As shown, output from an encoder as herein described are L analog output levels 751 which are input into a switch 780. Any of the techniques herein described (such as the analog mapping technique shown and described in FIGS. 5 and 6) may be used to map an input analog level into a complex number, namely I and Q components 782 and 784. In block 785 the N real frequency FFT bins (corresponding to the N subcarrier frequencies) are loaded with N/2−1 of the I,Q symbol pairs received from unit 780 as is described immediately above. Blocks 789-798 may be implemented as described above with the exception of DAC 742 which is not needed in this embodiment. Although output 799 is shown as an RF output, output over other types of electromagnetic pathways such as cables or optic fiber are also possible. As above in FIG. 6, the IFFT 789 may be preceded by a series-to-parallel converter and followed by a parallel-to-series combiner. And as in FIG. 6, no DAC is required.

Figure 7C:
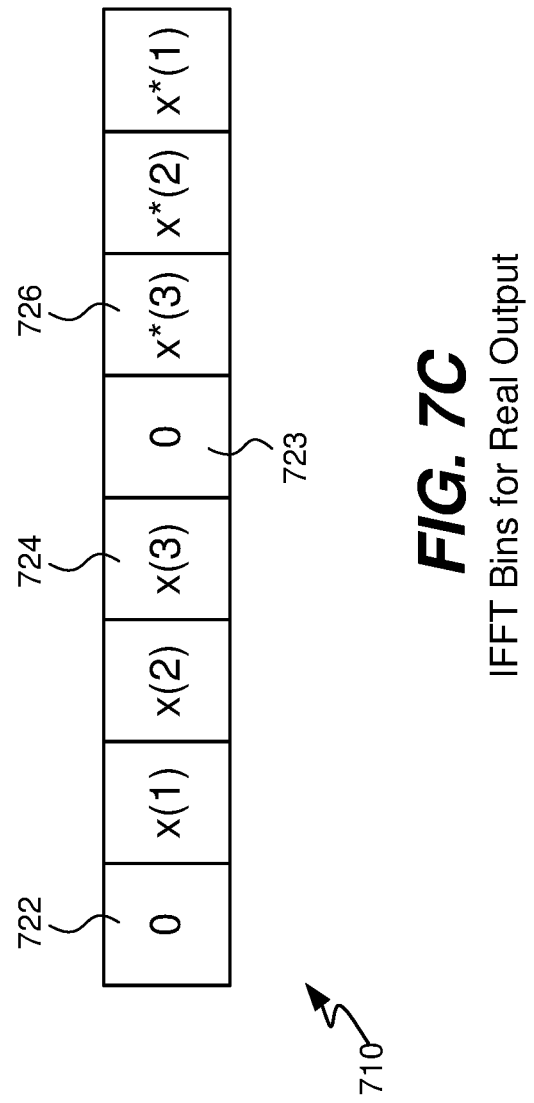
FIG. 7C illustrates IFFT bins used to produce real output.

FIG. 7C illustrates IFFT bins used to produce real output. Shown is an example of bins 710 where N=8; the zero bin 722 is set to 0, as is the middle bin 723. Bins 724 and 726 illustrate use of the complex conjugate in a symmetric loading of the bins.

OFDM Receiver and Demodulation

Above have been described embodiments for an OFDM transmitter and embodiments for inputting and mapping L digital output levels from an encoder and for inputting and distributing L analog output levels from an encoder in order to send an OFDM electromagnetic signal to a receiver. One of skill in the art, upon a reading of this disclosure, will find it straightforward to implement a corresponding OFDM demodulator and receiver that accepts the OFDM electromagnetic signal and outputs the L digital output levels or the L analog output levels as the case may be, using the conventions used in the corresponding OFDM transmitter relating to the digital mapping technique used or the analog distribution technique used to produce the complex numbers input to the inverse FFT. Similarly, if the OFDM transmitter inputs real numbers as opposed to complex numbers as described above, it will be straightforward for one of skill in the art to implement a corresponding OFDM demodulator and receiver using the conventions used in the corresponding OFDM transmitter relating to how real numbers are input into the inverse FFT. Moreover, similar to how the OFDM transmitter of FIG. 2 may be implemented with one or two DACs as described above, an OFDM receiver may be implemented with one ADC or with two ADCs, one each on the I and Q paths, as will be understood by one of skill in the art.

Spread Spectrum Video Transport (SSVT) Signal

Embodiments of the present disclosure described above use a novel discrete-time, continuous-amplitude EM signal termed a "spread-spectrum video transport" (SSVT) signal that is an improvement over existing SSDS-CDMA signals. SSVT refers to the transmission of electromagnetic (EM) video signals to a video sink over an EM pathway or pathways using the novel techniques disclosed herein.

Code Division Multiple Access (CDMA) is a well-known channel access protocol that is commonly used for radio communication technologies, including cellular telephony. CDMA is an example of multiple access, wherein several transmitters can send information simultaneously over a single communication channel. In telecommunications applications, CDMA allows multiple users to share a given frequency band without interference from other users. CDMA employs Spread Spectrum Direct Sequence (SSDS), encoding which relies on unique codes to encode each user's data. By using unique codes, the transmission of the multiple users can be combined and sent without interference between the multiple users. On the receive side, the same unique codes are used for each of the multiple users to demodulate the transmission, recovering the data of each user respectively. SSVT is different from CDMA as will be explained in greater detail below.

SSVT Transmitter Distributor/Encoder

FIG. 8 illustrates digital encoding of sampled signals before input into an OFDM transmitter 80. As described herein, in U.S. Pat. No. 10,158,396 and in U.S. patent application Ser. Nos. 16/494,901 and 17/503,984, an input vector 110 including any number of digital or analog samples is encoded within an encoder using codes from a code book in order to produce L output levels 160 for input into OFDM transmitter 80 and then transmission over an electromagnetic pathway. Further description of this encoding technique may be found below. In this example, the samples are digital values, digital encoding is used, and output levels 160 are digital values. As will be described in greater detail below, analog samples, analog encoding and analog output levels may also be used, and an example of L analog output levels input into an OFDM transmitter is shown in FIGS. 6 and 7B.

Input vector 110 includes N samples 112-118. In this example, each sample is 5 bits long and sample 112 has the value "01101." There are N codes 122-128, each code corresponding to one of the samples, each code being L bits long and each being orthogonal to the other. To perform the encoding, each chip of the code corresponding to a particular sample modulates 130 that sample thus producing L modulated values for each sample. In this simple example, modulation of sample 112 by the first chip of code 122 results in the modulated value 142(1). Modulating each sample by the first chip of its corresponding code results in modulated values 142(1)-148(1). These modulated values 142(1)-148(1) are then summed 150 to produce the first digital output level 161. The other modulated values 142(2:L)-148(2:L) are then summed in a similar fashion to produce the rest of output levels 160. This stream of digital output levels may then be input into the OFDM transmitters of FIGS. 2 and 7A as has been described above. Although outputs 90 and 749 are shown as an RF output, output over other types of electromagnetic pathways such as cables or optic fiber are also possible.

Output levels 160 may have any suitable bit length; in one embodiment, the length of each output level is 10 bits. Accordingly, a 1024-QAM (e.g., for every number of bits, n, a $2^n$ QAM will be used) constellation may be used to perform the mapping of these values for use in the OFDM transmitter that accepts digital inputs. And, as mentioned above, if analog values are input into the OFDM transmitter then mapping to a constellation is not required. Further, digital or analog output levels from the encoder may also result in real numbers (rather than complex numbers) being used by the OFDM transmitter. Improvements to mapping of digital inputs, mapping of analog inputs and use of real numbers are described in detail above.

Figure 9:
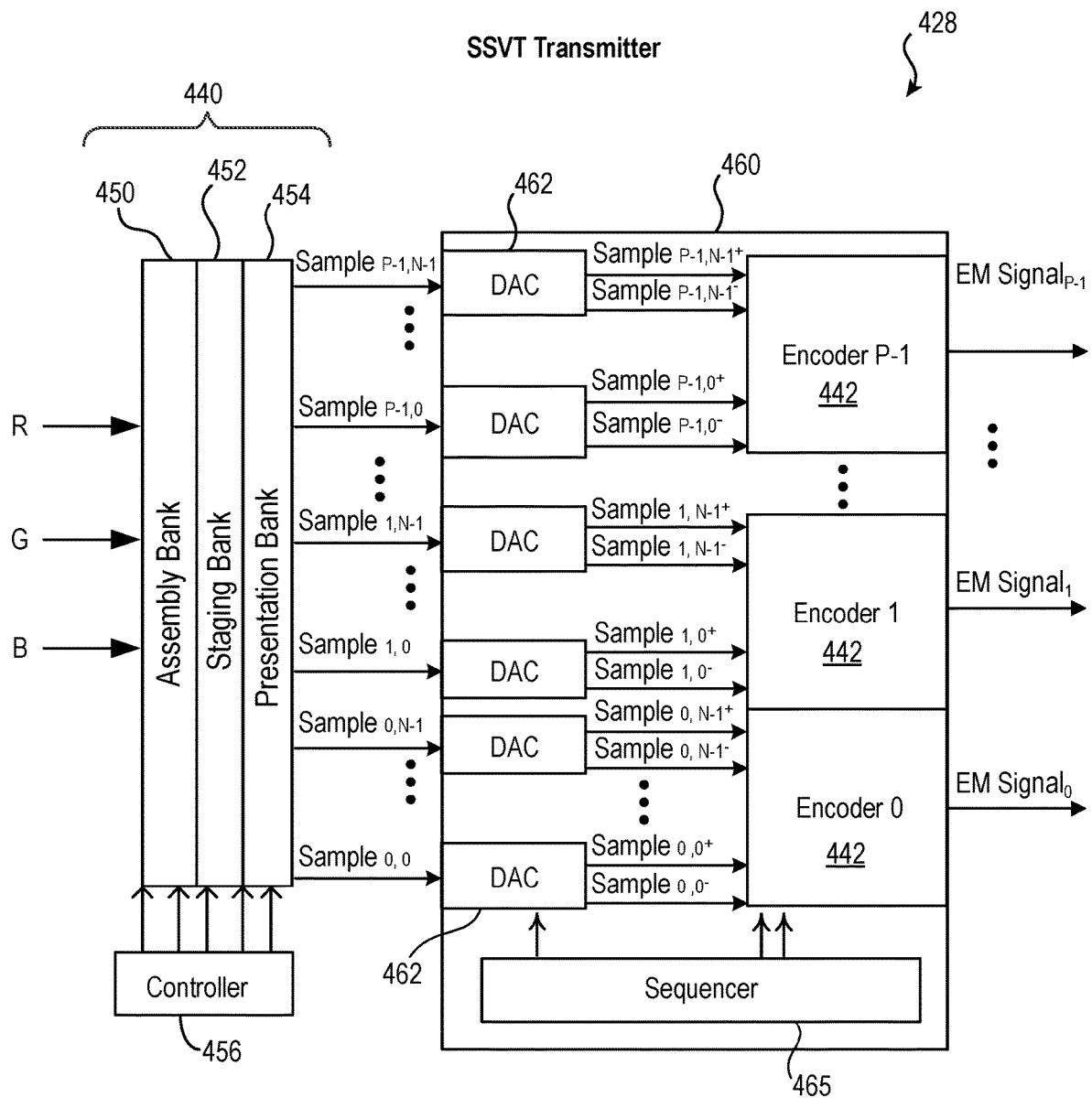
FIG. 9 illustrates a logic block diagram of a specific implementation of an SSVT transmitter.

FIG. 9 illustrates a logic block diagram of a specific implantation of an SSVT transmitter 428. The distributor 440 includes an assembly bank 450, a staging bank 452, a presentation bank 454 and a controller 456. An encoder block 460 includes a bank of digital-to-analog converters (DACs) 462 and four encoders 442, one for each EM pathway of a transmission medium. As mentioned herein, a stream of samples from a single source (such as a camera, image sensor, another sensor, etc.) arrives at transmitter 428 for encoding. Each encoder 442 encodes one input vector, such as input vector 110, and produces a series of output levels, such as output levels 160, as an EM Signal. Accordingly, there may be any number (P) of encoders 102 and corresponding OFDM transmitters, one encoder and OFDM transmitter per EM pathway. It is also possible to multiplex several encoder outputs to a single OFDM transmitter in which case there will be fewer transmitters than encoders.

The distributor 440 is arranged to receive the exposed color information (e.g., RGB) for the stream of sets of samples, one after the other. In response, the assembly bank 450 builds the four vectors $V_0$, $V_1$, $V_2$ and $V_3$ from the exposed color information (e.g., RGB) for the incoming stream of sets of samples. As the sets of samples are received, they are stored in the assembly bank 450 according to a predetermined permutation. The distributor 440 may use any number of different permutations when building the vectors containing N samples each.

The staging bank 452 facilitates the crossing of the N samples of each of the four vectors $V_0$, $V_1$, $V_2$ and $V_3$ from a first clock frequency (or first timing domain) used by a retimer into a second clock frequency (or second domain) used for the encoding and transmission of the resulting EM Signals over the transmission medium. Using the example with N=60 and S=3, the samples representing exactly 80 sets of RGB samples are contained in the four encoder input vectors $V_0$, $V_1$, $V_2$ and $V_3$.

In various embodiments, the first clock frequency can be faster, slower or the same as the second clock frequency. The first clock frequency f_pix is determined by the video format selected by a video source. The second clock frequency f_ssvt is a function of f_pix, the number P of EM pathways in the transmission medium, the number S of samples in each set of input/output samples, and the SSVT transform parameters N (the number of input/output vector locations) and L (the length of each SSDS code), where f_ssvt= (f_pix*S*L)/(P*N). With this arrangement, the input clock (pix_clk) oscillates at one rate, and the SSVT clock (ssvt_clk) oscillates at another rate. These rates can be the same or different. The encoder performs the encoding while the next input vector is prepared. The presentation bank 454 presents the N samples of each of the four encoder input vectors $V_0$, $V_1$, $V_2$ and $V_3$ to the encoder block 460 (e.g., vector $V_0$ includes $Sample_{0,0}$ through $Sample_{0,N-1}$)

Controller 456 controls the operation and timing of assembly bank 450, the staging bank 452, and the presentation bank 454. In particular, the controller is responsible for defining the permutation used and the number of samples N when building the four encoder input vectors $V_0$, $V_1$, $V_2$ and $V_3$. The controller 456 is also responsible for coordinating the clock domain crossing from the first clock frequency to the second clock frequency as performed by the staging bank 452. The controller 456 is further responsible for coordinating the timing of when the presentation bank 454 presents the N samples of each of the encoder input vectors $V_0$, $V_1$, $V_2$ and $V_3$ to the encoder block 460.

Within the encoder block 460, a plurality of digital-to-analog converters (DACs) 462 is provided, each arranged to receive one of the P*N samples ($Sample_{0,0}$ through $Sample_{P-1,N-1}$) assigned to the four encoder input vectors $V_0$, $V_1$, $V_2$ and $V_3$ collectively. Each DAC 462 converts its received sample from the digital domain into a differential pair of voltage signals having a magnitude that is proportional to its incoming digital value. The output of the DACs 462 may range from a maximum voltage to a minimum voltage.

The four encoders 442 are provided for the four encoder input vectors $V_0$, $V_1$, $V_2$ and $V_3$ respectively. Each encoder 442 receives the differential pair of signals for each of the N samples for its encoder input vector, modulates each of the N differential pair of voltage signals using chips from a code corresponding to each sample, accumulates the modulated values and then generates a differential EM Signal output. Since there are four encoders 442 in this example, there are four EM Signals ($Signal_0$ through $Signal_3$) that are simultaneously transmitted over the transmission medium.

A sequencer circuit 465 coordinates the timing of the operation of the DACs 462 and the encoders 442. The sequencer circuit 465 is responsible for controlling the clocking of the DACs 462 and the encoders 442. The sequencer circuit 465 is also responsible for generating two clock phase signals, "clk 1" and "clk 2", that are responsible for controlling the operation of the encoders 442.

A receiver corresponding to transmitter 428 may be used to receive the output levels, decode, and collect the samples into RGB signals, as will be appreciated by one of skill in the art upon a reading of this disclosure. This example shows analog encoding, but digital encoding (and decoding) may also be used. DACs or ADCs may precede or follow the encoders (or decoders) as the case may be and as required by an implementation.

SSVT Signal, Encoding and Decoding

As mentioned above, various embodiments of the present invention disclose that encoded output levels (analog or digital)—an SSVT signal—are input into an OFDM transmitter, or that an OFDM receiver receives an OFDM-modulated signal and produces an SSVT signal for decoding. The below describes that SSVT signal in more detail and provides its advantages.

Embodiments of the present disclosure disclose a novel "spread-spectrum video transport" (SSVT) signal (which is a discrete-time, continuous-amplitude EM signal) that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

Figure 10:
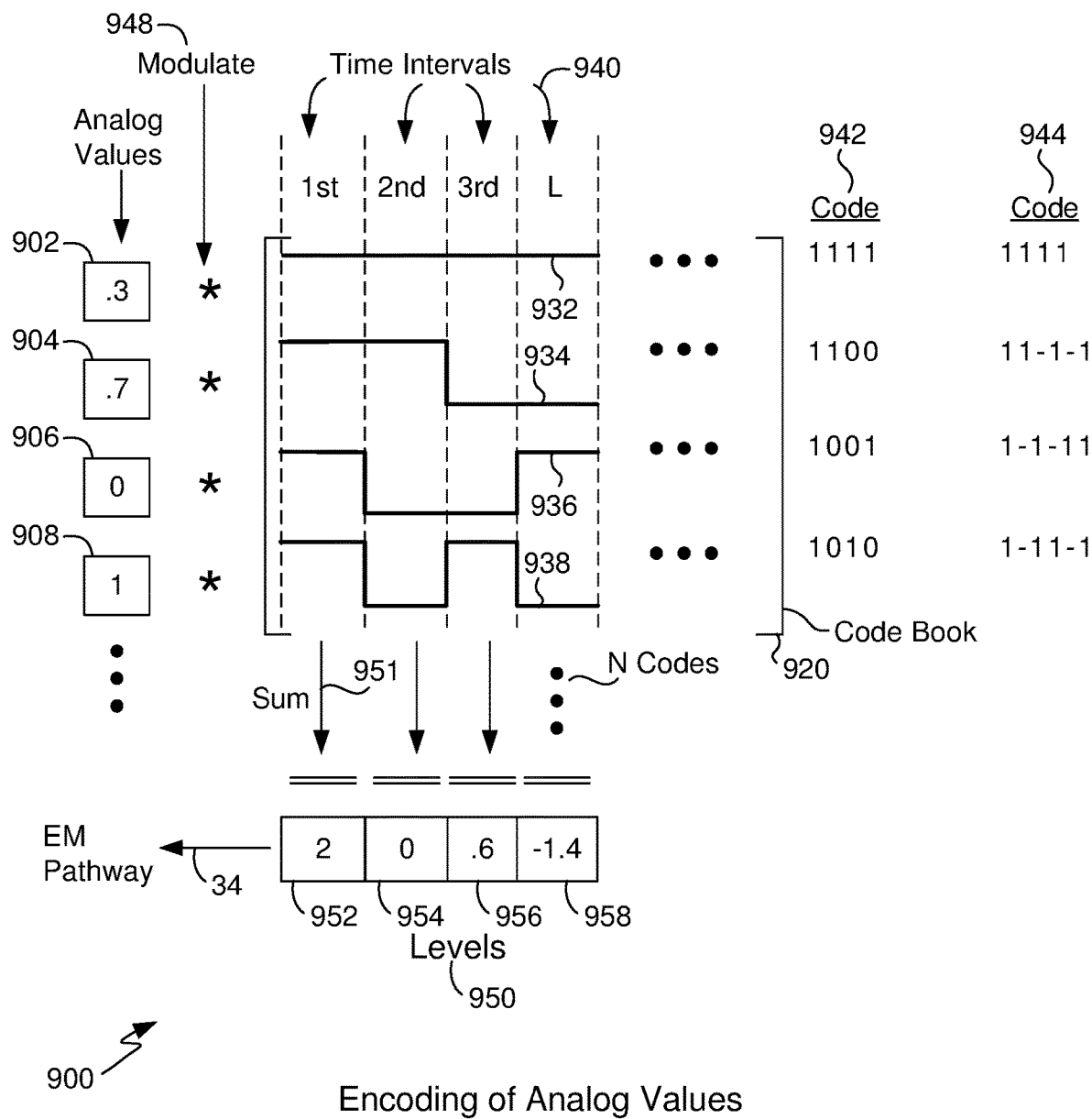
FIG. 10 illustrates a simplistic example showing how signal samples, in this case, analog values, are encoded within an encoder and then sent over an electromagnetic pathway.

FIG. 10 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the range of these voltages is from 0 to 1 V for efficiency, although a different range is possible. These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

Figure 11:
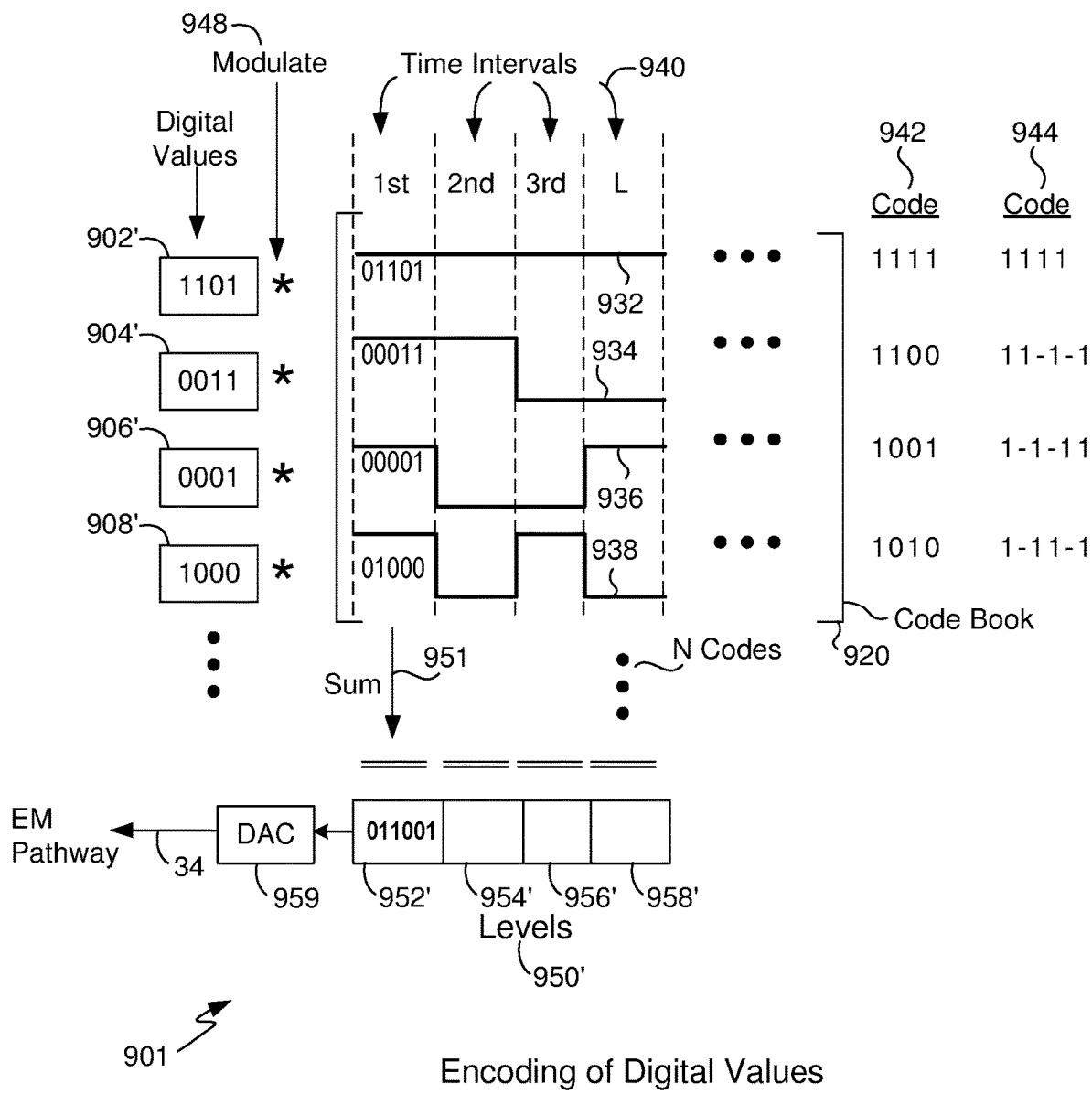
FIG. 11 illustrates this novel encoding technique as being applicable to signal samples that are digital values.

FIG. 11 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "-1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a -1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations, the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 12:
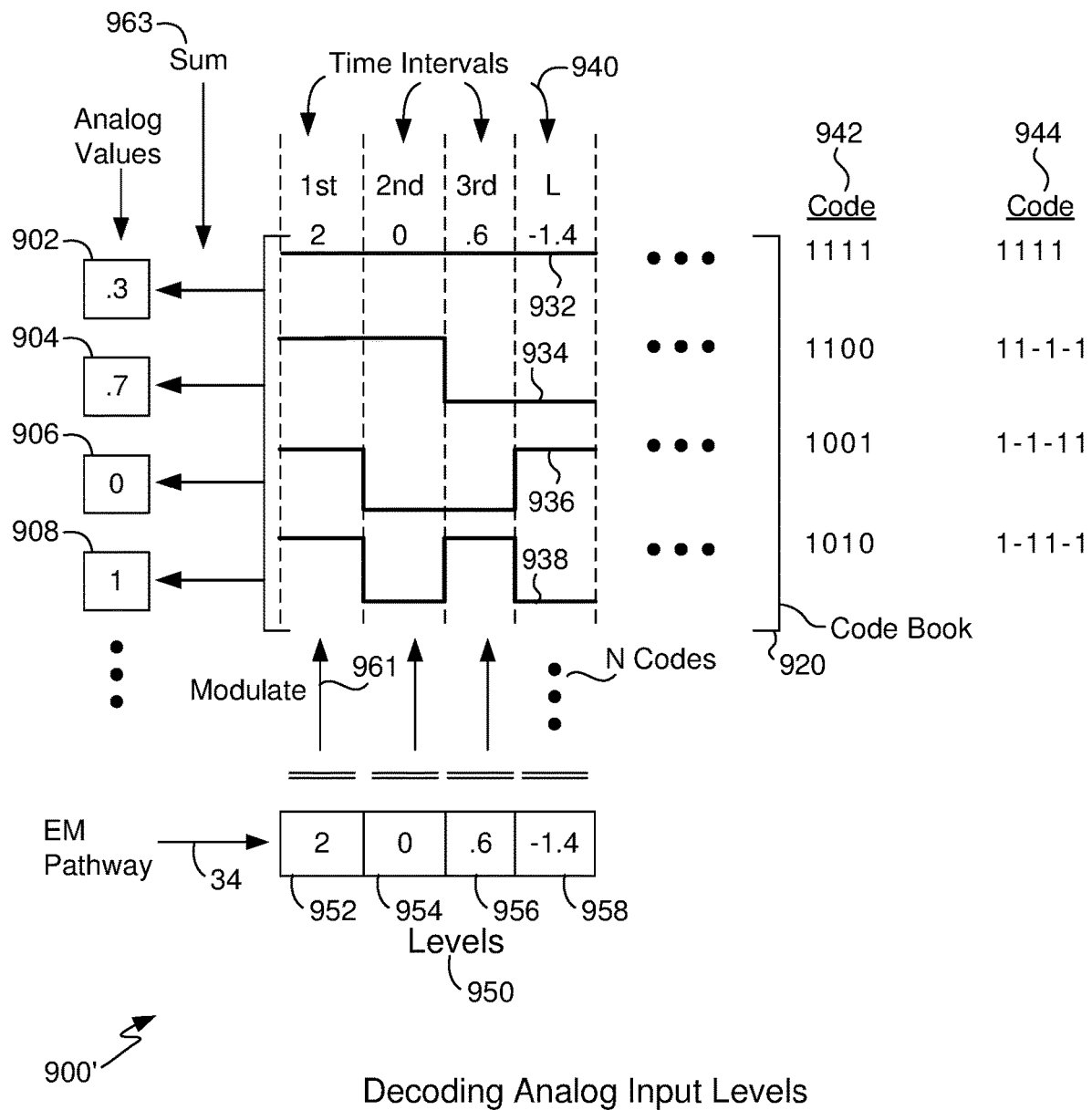
FIG. 12 illustrates decoding of analog input levels that were encoded using the encoder of FIG. 10.

FIG. 12 illustrates the decoding of analog input levels that were encoded using the encoder of FIG. 10. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, -1.4". Modulation of levels 952-958 by the second code 934 produces the series of modulated values "2, 0, -0.6, 1.4". Modulation by the third code 936 produces "2, 0, -0.6, -1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 13A:
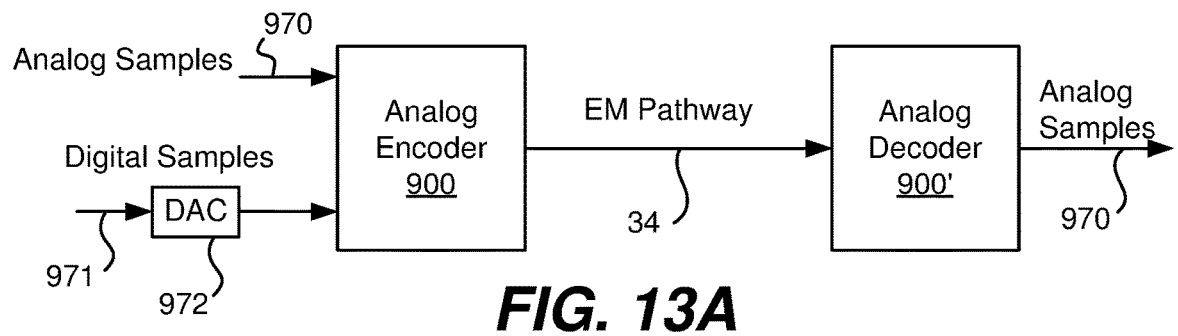
FIG. 13A illustrates use of an analog encoder and a corresponding analog decoder.
Figure 13B:
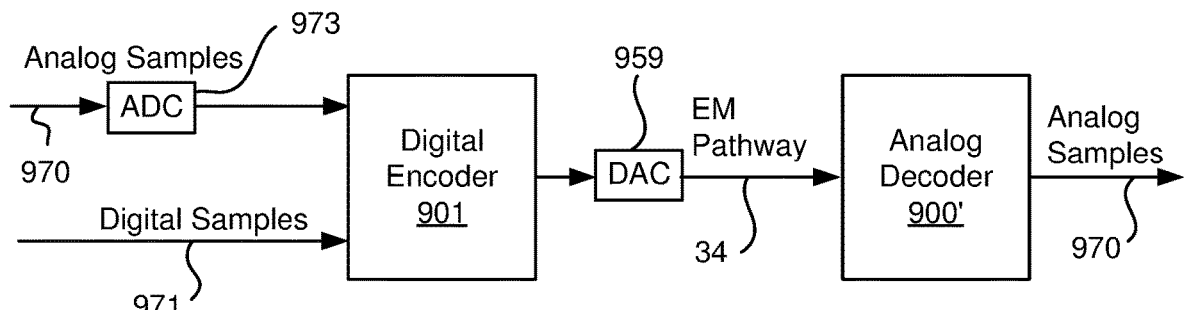
FIG. 13B illustrates use of a digital encoder and a corresponding analog decoder.
Figure 13C:
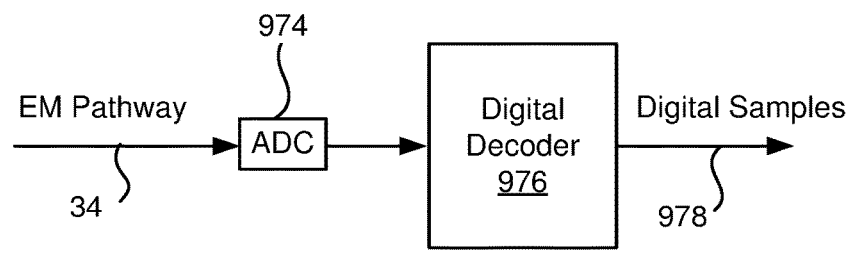
FIG. 13C illustrates use of a digital decoder to decode encoded analog signals that have arrived over an electromagnetic pathway on transmission medium.

FIGS. 13A, 13B and 13C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 13A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as-is or may be converted into digital samples using an ADC (not shown).

FIG. 13B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 13C illustrates use of a digital decoder to decode encoded analog signals that have arrived over an electromagnetic pathway on transmission medium 34. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

FIG. 14 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art.

Orthogonal Frequency Division Multiplexing Video Transport

Above are described techniques by which a spread spectrum video transport (SSVT) technique is combined with orthogonal frequency division multiplexing (OFDM) and related improvements in order to provide more resilient transport of samples. It is further realized that OFDM transport without being combined with SSVT has substantial benefits and sufficient resiliency, especially when its related improvements are incorporated (such as improved symbol mapping of digital and analog samples, real number output from IFFT, etc.) or when it is used to transport video samples. The below describes embodiments of these novel OFDM transport techniques.

This OFDM video transport may be used to send video wirelessly over relatively long distances to a display, television or monitor, for example. OFDM video transport may be used to send video over a high-frequency wireless channel, e.g., 60 GHz, where 2 GHz bandwidth is possible, although the wireless channel may require dynamic equalization due to the changes in the channel. Digital transmissions require error correction codes in order to fix these problems; OFDM video transport does not need these error correction codes.

One advantage of using OFDM transport in the context of image capture and display is that images are traditionally measured on intrinsically error-prone sensors and displayed on intrinsically noisy LED arrays and viewed by extremely complex and robust human vision systems. As a result, the communication requirements for video are very different from the communication requirements for conventional digital artifacts such as spreadsheets and electronic mail, wherein bit-perfect transmission is required. Nevertheless, conventional video transmission treats a video signal just like another kind of (digital) document. With OFDM video transport, however, video signals are transmitted in an electrically robust manner. Among the advantages of OFDM video transport is the fact that any uncompensated errors occurring in the EM signal measurement at the receiver manifest in the reconstructed images as broad-spectrum temporal and spatial noise. Such white noise is more palatable to human cognition than are the blank screens, repeated images, and blocky compression artifacts that arise from the conventional bit-serial transmission.

Figure 15:
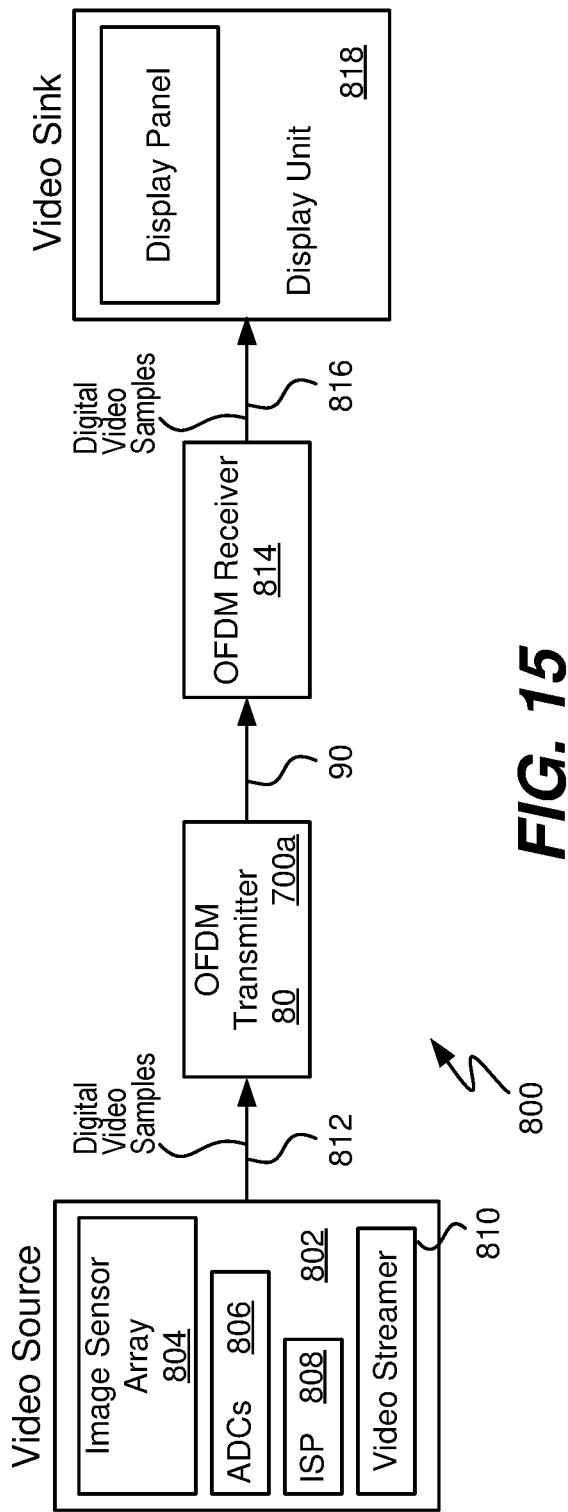
FIG. 15 illustrates transport of digital video samples from a video source to a video sink using an OFDM transmitter and an OFDM receiver

FIG. 15 illustrates transport of digital video samples from a video source to a video sink using an OFDM transmitter and an OFDM receiver. Shown is a video source 802 that generates digital video samples 812. The video source includes an image sensor array 804, one or more analog-to-digital converters 806, an optional Image Signal Processor (ISP 808), and an optional video streamer 810 responsible for generating a stream of video samples 812. Video source 802 may be any device capable of capturing imaging information, such as but not limited to a still camera, video camera, an infrared imaging device, an ultrasound imaging device, a magnetic resonance imaging (MRI) device, computed tomography, or any other type of imaging device capable of generating video information.

Image sensor 804 is any device capable of generating an electronic signal that is proportional to an amount of measured light. For example, the image sensor is a planar array of photodiodes. Each photodiode represents a pixel location in the planar array and the number of photodiodes in the planar array may widely vary and is dependent on the size of the image sensor. A "4K" imaging sensor, for instance, includes a photodiode array of 3840 horizontal lines by 1080 vertical lines, for a total of 4,147,200 photodiodes. It should be understood that 4K is merely an example of resolution and the image sensor 804 may be any size, including less than 480, 480, 720, 1080, 4K, 8K, or larger.

During operation, image sensor 804 continually repeats a sensing interval at a given refresh rate. During each sensing interval, each photodiode in the array generates for every pixel position an electrical voltage that is inversely proportional to the number of photons generated the photodiode. As a result, the array of photodiodes generates a set of voltages that collectively represent a frame. As the image sensor is continually refreshing at a given frame rate, multiple sets of voltages, each representing a frame, are continuously generated one after another.

For each pixel position, the photodiode is provided between a capacitor and ground. Just prior to a sensing interval, the capacitor is pre-charged. When sensing, the photodiode generates a current that is proportional to the magnitude of light received. When little to no light is sensed, there is little to no capacitor discharge to ground through the photodiode. Conversely, if a large amount of light is sensed, then a large portion of the voltage on the capacitor is discharged. The voltage remaining on the capacitor following the exposure interval is therefore inversely proportional to the magnitude of the sensed light.

With image sensor arrays, there is typically a row of analog-to-digital converters ("ADCs") 806, with one ADC per column. During a given frame interval, all the rows of the array 804 are sampled, typically one after the other from top to bottom, sometimes referred to herein as "row-major" order. With each sample, the ADCs convert the sensed voltage into a digital value for the pixel position for each column in the array. A frame is complete when all the rows of the array have been sampled. The above process is repeated, in row-major order, on a frame-by-frame basis. The net result is a string of digital values, with each digital value representative of a pixel position in a frame. The number of bits used to represent each sample may widely vary. For instance, each voltage may be converted by the analog-to-digital converters 806 into an 8- or 10-bit value; the number of bits used to represent the pixel voltage values may be more or less than 8 or 10.

Image sensor array 804 may be either monochromatic or color. In the case of the former, the digital values generated by the ADCs are representative of only one color. With the latter, well known color techniques such as Bayer filtering is typically applied. With Bayer filtering, the individual photodiodes are selectively covered with filters of a predetermined color (e.g., either Red or Blue or Green). In alternative embodiments, CYGM (Cyan, Yellow, Green and Magenta) or CMY (Cyan, Magenta and Yellow) filtering may be used. Regardless of the type of filter used, the magnitude of the filtered light is measured at each sample position.

The ISP 808 is arranged to interpolate the string of digital values received from the ADCs. By interpolation, the ISP 808 takes the information contained in the digital values for each pixel measurement and its geometric neighborhood and defines an estimate of the color of the corresponding pixel. To output full-color images in a specific color space (there are many), the ISP 808 interpolates the "missing" color values at each location. That is, given only a single-color measurement per pixel, the ISP algorithmically estimates the "missing" color values to create, for example, an RGB or YCbCr representation for the pixel. The ISP 808 thus generates a set of samples for a given pixel of a given frame, each set of samples representative of the color values (either as measured or interpolated) for a given pixel position within the frame.

The contents of a given set of samples may vary since there are many ways to represent color. Generally, RGB is considered full color, and other spaces such as YCbCr are approximations of full color that are smaller to transmit. With YCbCr, Y is the luminance component and Cb and Cr are the blue-difference and red-difference chroma values, respectively. YCbCr color spaces are defined by a mathematical coordinate transformation from an associated RGB color space. In yet another way to represent color, an "alternating" approach can be used. For example, every second pixel is represented by its Luminance (Y) value, while alternating pixels are represented by either Cb (Blue) or Cr (Red) values. Accordingly, each set of samples includes some number S of sample values that are transmitted in parallel. With RGB, the number of samples per set of samples is S=3, while for YCbCr, S=2.

The video streamer 810 generates a sequence of time-ordered sets of samples received from the ISP 808. In general, each set of samples output together represents the light measurement for one pixel location on the image sensor 804. The values and number of samples produced by the ISP per pixel location depends upon the ISP implementation and, in particular, on the color space applied. The output of the video streamer 810 is a continuous stream of time-ordered sets of digital video samples 812, each representative of a pixel in a row, from left to right, in row-major order, frame after frame, so long as image sensor 804 is sensing. Once the stream of sets of digital video samples 812 has been transmitted and received at video sink 818, the samples are then processed by the video sink in order to reconstruct the images sensed, frame-by-frame, by the image sensor array 804.

Once output from a video source 802, the digital video samples 812 are input into OFDM transmitter 80 or into OFDM transmitter 700a (described above in FIGS. 2 and 7A, respectively) and then transmitted via OFDM signal 90. The OFDM transmitter may be located in any suitable location: integrated within video source 802, in close proximity to video source 802, or located at a great distance from video source 802. Once transmitted, OFDM signal 90 may travel any suitable distance before being received.

In one embodiment, a DAC or DACs are not required in the transmitter and the output signal 90 will be a digital signal. In the corresponding receiver, ADCs are then not needed before the FFT circuitry. This implementation without DAC or ADC is possible if the frequency transformation is implemented in the analog domain.

Once transported, OFDM signal 90 is received at OFDM receiver 814 (which may be a receiver corresponding to transmitter 80 or to transmitter 700a). One of skill in the art, upon a reading of this disclosure and understanding of the operation of OFDM transmitter 80 or of OFDM transmitter 700a will find it straightforward to implement such an OFDM receiver 814. Depending upon the location of the OFDM transmitter and the distance over which it is desired to transmit the OFDM signal 90, the location of OFDM receiver 814 may be specified. It is possible that OFDM receiver 814 may be in close proximity to the video source, may be located intermediate between the video source and the video sink, or may be located in close proximity to, or within, the video sink. Once the digital video samples 816 are output from the OFDM receiver 814 they are delivered to a video sink and displayed upon its display panel using techniques known to those of skill in the art.

Figure 16:
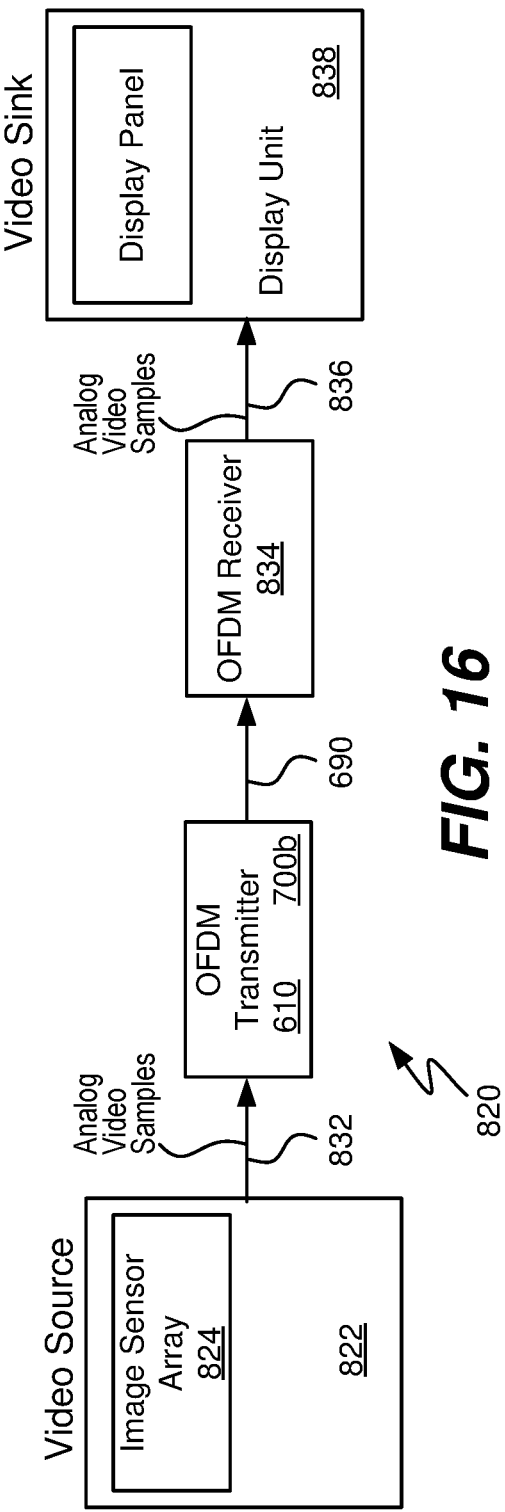
FIG. 16 illustrates transport of analog video samples from a video source to a video sink using an OFDM transmitter and an OFDM receiver.

FIG. 16 illustrates transport of analog video samples from a video source to a video sink using an OFDM transmitter and an OFDM receiver. Shown is a video source 822 that generates analog video samples 832. The video source may be any of the video sources mentioned above and includes an image sensor array 824 as previously described. Note that no analog-to-digital converters (ADCs) are required within the video source in this embodiment, thus reducing expense, space required, heat generated and complexity of the video source. An ISP may be added if needed.

The output of video source 822 is analog video samples 832. Once the stream of sets of analog video samples has been transmitted and received at video sink 838, the samples are then processed by the video sink in order to reconstruct the images sensed, frame-by-frame, by the image sensor array 824.

Once output from a video source 822, the analog video samples 832 are input into OFDM transmitter 610 or into OFDM transmitter 700b (described above in FIGS. 6 and 7B, respectively) and then transmitted via OFDM signal 690. The OFDM transmitter may be located in any suitable location: integrated within video source 822, in close proximity to video source 822, or located at a great distance from video source 822. Once transmitted, OFDM signal 690 may travel any suitable distance before being received.

Once transported, OFDM signal 690 is received at OFDM receiver 834 (which may be a receiver corresponding to transmitter 610 or to transmitter 700b). One of skill in the art, upon a reading of this disclosure and understanding of the operation of OFDM transmitter 610 or of OFDM transmitter 700b will find it straightforward to implement such an OFDM receiver 834. For instance, as transmitter 610 or transmitter 700b input and operate upon analog input samples, no DAC is needed within the transmitter, and correspondingly, OFDM receiver 834 needs no ADCs—it outputs analog video samples corresponding to the analog video samples originally input into the transmitter. In an embodiment in which a video sink requires digital video samples, the A-to-D conversion may happen at the receive end (e.g., within the video sink), thus locating the ADCs remotely from the video source and reducing circuit complexity and cost.

Depending upon the location of the OFDM transmitter and the distance over which it is desired to transmit the OFDM signal 690, the location of OFDM receiver 834 may be specified. It is possible that OFDM receiver 834 may be in close proximity to the video source, may be located intermediate between the video source and the video sink, or may be located in close proximity to, or within, the video sink. Once the analog video samples 836 are output from the OFDM receiver 814 they are delivered to a video sink and displayed upon its display panel using techniques known to those of skill in the art.

Figure 17:
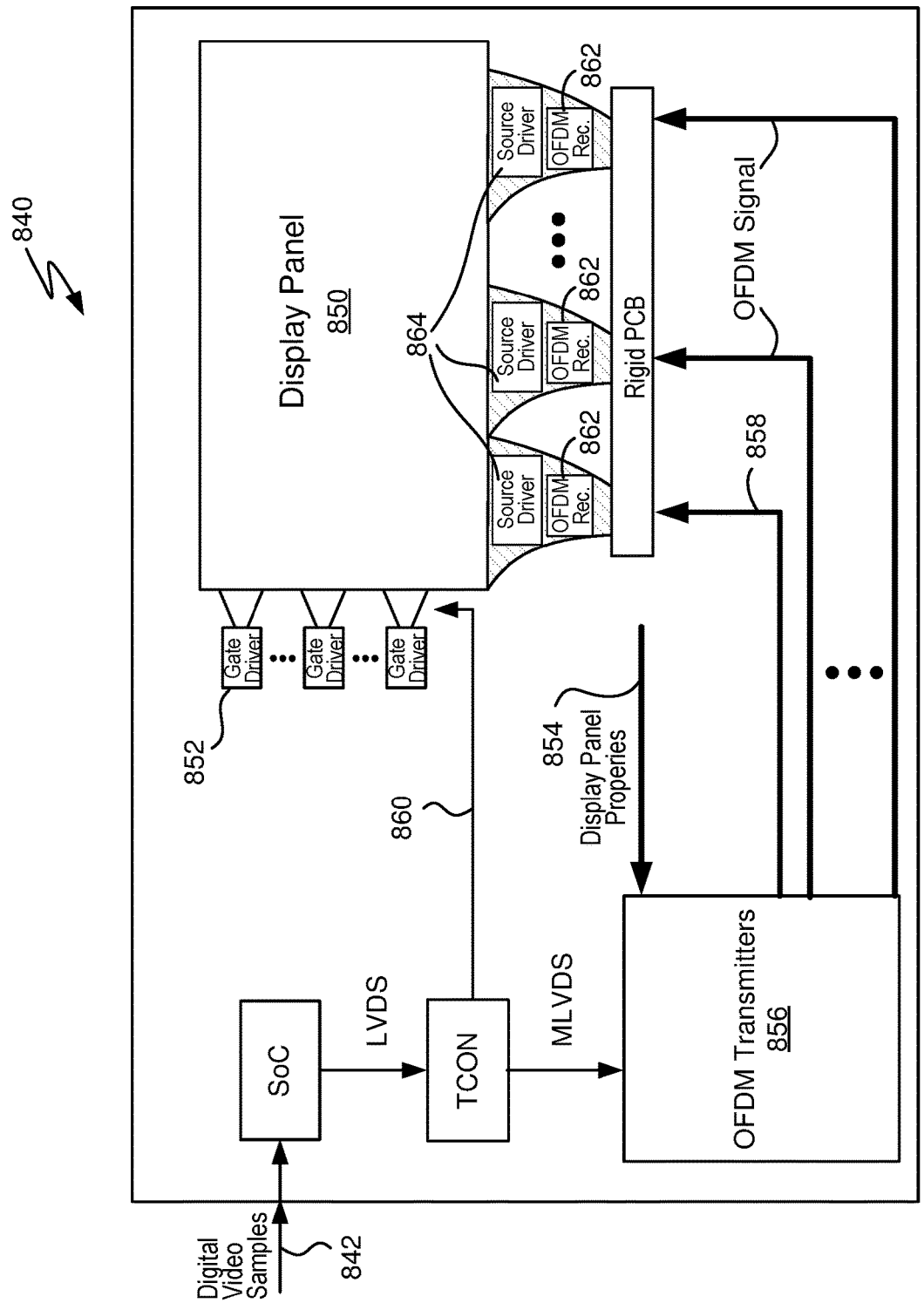
FIG. 17 illustrates an embodiment in which both the OFDM transmitter and OFDM receiver are located within a display unit 840, such as a large-format television or screen.

FIG. 17 illustrates an embodiment in which both the OFDM transmitter and OFDM receiver are located within a display unit 840, such as a large-format television or screen. From display panel 850 signals 854 optionally provide information concerning the display panel back to OFDM transmitters 856 to assist with generation of the OFDM signals if necessary. Generation of the gate driver power and control signals 860 may be performed by the timing controller (or by other specific hardware) based on synchronization information from the source drivers. As is known in the art, digital video samples 842 are received at the display unit and are processed by an SoC and timing controller (TCON).

In this embodiment, any number of OFDM transmitters 856 each transmit an OFDM signal 858 to an OFDM receiver 862 located at or integrated with each source driver 864 which generate source voltages for the display panel. The transmission medium for each signal 858 may be a cable (such as HDMI, flat cable, fiber optic cable, metallic cable, non-metallic carbon-track flex cables), or can be wireless. This set of OFDM transmitters 856 may be those that receive digital input (such as transmitters 80 and 700a) or may be transmitters that receive analog input (such as transmitters 610 and 700b). In the case of the transmitters that receive analog input, each is preceded by a DAC (not shown) that converts the incoming digital video samples into analog samples. Each OFDM receiver 862 may be located on a flexible PCB along with each source driver 864, or each may be integrated within each source driver such as within a single source driver chip. Typically, most display panels having more than about 1,024 columns are implemented with an array of source driver chips due to pin count constraints, one source driver per chip. For panels of fewer columns, it is contemplated that only a single source driver is needed. Depending upon which OFDM transmitters are used, different OFDM receivers and arrangements may be used as explained below.

In an embodiment in which multiple OFDM transmitters 856 are used in the display unit, a distributor similar to distributor 440 of FIG. 9 may be used to distribute the digital or analog video samples coming from the TCON to the transmitters 856; i.e. the incoming stream of digital or analog samples are distributed to provide each OFDM transmitter with a stream of samples. Any suitable permutation may be used. Thus, if there are P OFDM transmitters 856 (P being an integer greater than or equal to one), the samples from the TCON will be distributed into P vector streams, one stream for each OFDM transmitter. One or more banks may be used in the distributor and each output vector stream of the distributor is preferably a serial output of samples for input into its corresponding OFDM transmitter. In a similar fashion, if multiple OFDM transmitters are used in FIG. 15 or FIG. 16, then a similar distributor may be used to distribute the incoming samples 812 or 832 into the multiple OFDM transmitters. If a distributor is used in FIG. 15 or 16 then a corresponding collector may be used after OFDM receiver 814 or 834 to produce the corresponding stream of samples 816 or 836.

A distributor may be used if the display unit of FIG. 17 has multiple OFDM transmitters 856 and may be implemented as per the distributor 440 of FIG. 9. The output of the distributor may be serial into each OFDM transmitter. Or, single or multiple output streams can be multiplexed or unified into a single or multiple transmitters. The number of these channels depends on the resolution and OFDM bandwidth, and one may divide a high resolution video stream into multiple streams. Each stream will then have a lower bandwidth than a single high-resolution stream and the samples will be serialized per stream. The number of streams depends upon the implementation and can vary depending on the video source resolution, number of sources, and available bandwidth per OFDM channel.

Figure 18:
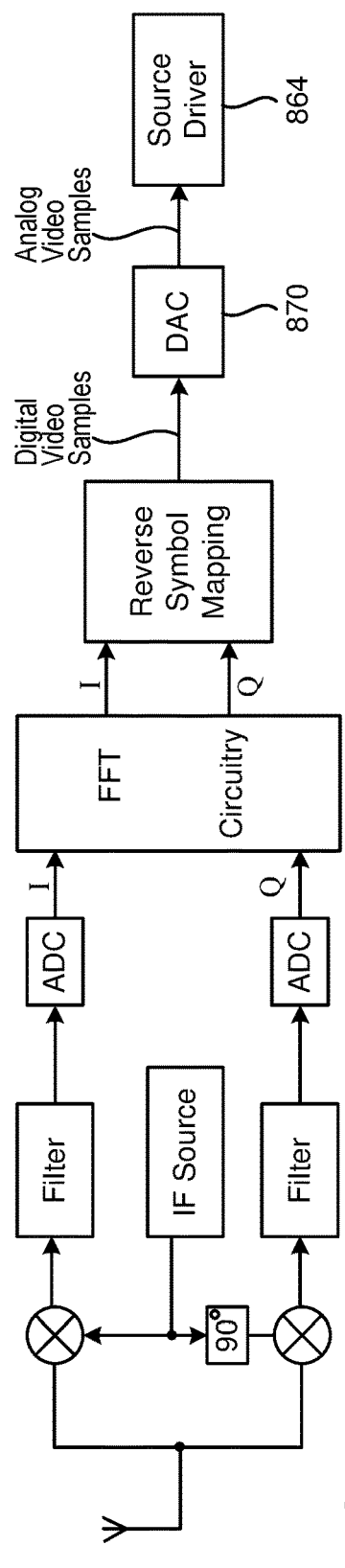
FIG. 18 illustrates a digital OFDM receiver having analog output located at a source driver.

FIG. 18 illustrates a digital OFDM receiver having analog output located at a source driver. OFDM receiver 814 is used if the OFDM transmitter is a transmitter that inputs digital video samples such as transmitter 80 or transmitter 700a; accordingly, receiver 814 includes at least one ADC and performs reverse symbol mapping in order to output the original digital video samples that had been input to the OFDM transmitter. Instead of two ADCs as shown, a single ADC may be placed at the input to the receiver near the antenna; other techniques for converting the incoming analog signal to digital before the FFT circuitry may also be used. A DAC 870 may be added at its output in order to provide analog video samples to one of the source drivers 864. A source driver 864 that accepts analog video samples is described below. FIG. 18 is a general diagram of a digital OFDM receiver that corresponds to an OFDM transmitter that inputs digital values. As there is digital input at the OFDM transmitter then ADCs are used within the digital OFDM receiver before the FFT.

Figure 19:
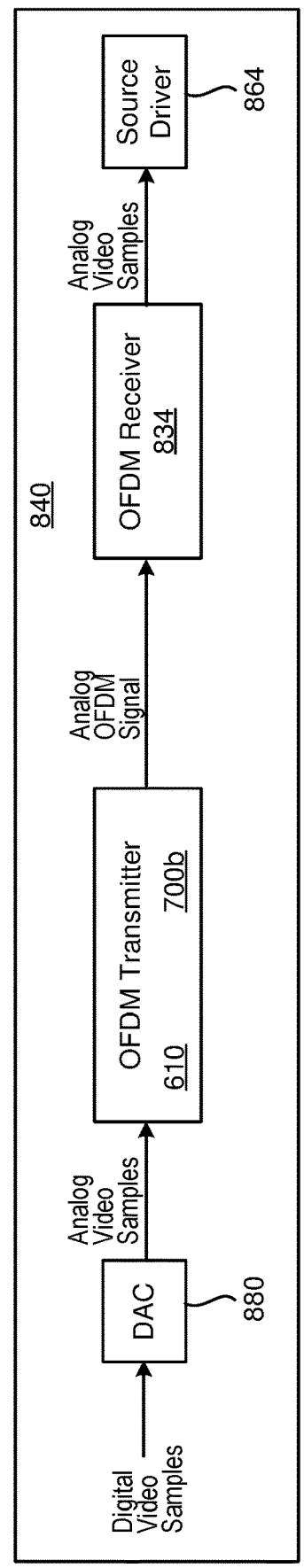
FIG. 19 illustrates an analog OFDM receiver having analog output located at a source driver.

FIG. 19 illustrates an analog OFDM receiver having analog output located at a source driver. Shown is a display unit 840 in which the OFDM transmitter 856 is a transmitter that inputs analog video samples such as transmitter 610 or transmitter 700b; accordingly, a DAC 880 is added in order to convert the incoming digital video samples into analog samples. As this OFDM transmitter inputs analog video samples, an OFDM receiver such as receiver 834 may be used that performs reverse symbol mapping in order to output the original analog video samples that had been input to the OFDM transmitter and to provide these analog video samples to one of the source drivers 864. A source driver 864 that accepts analog video samples is described below.

Figure 20:
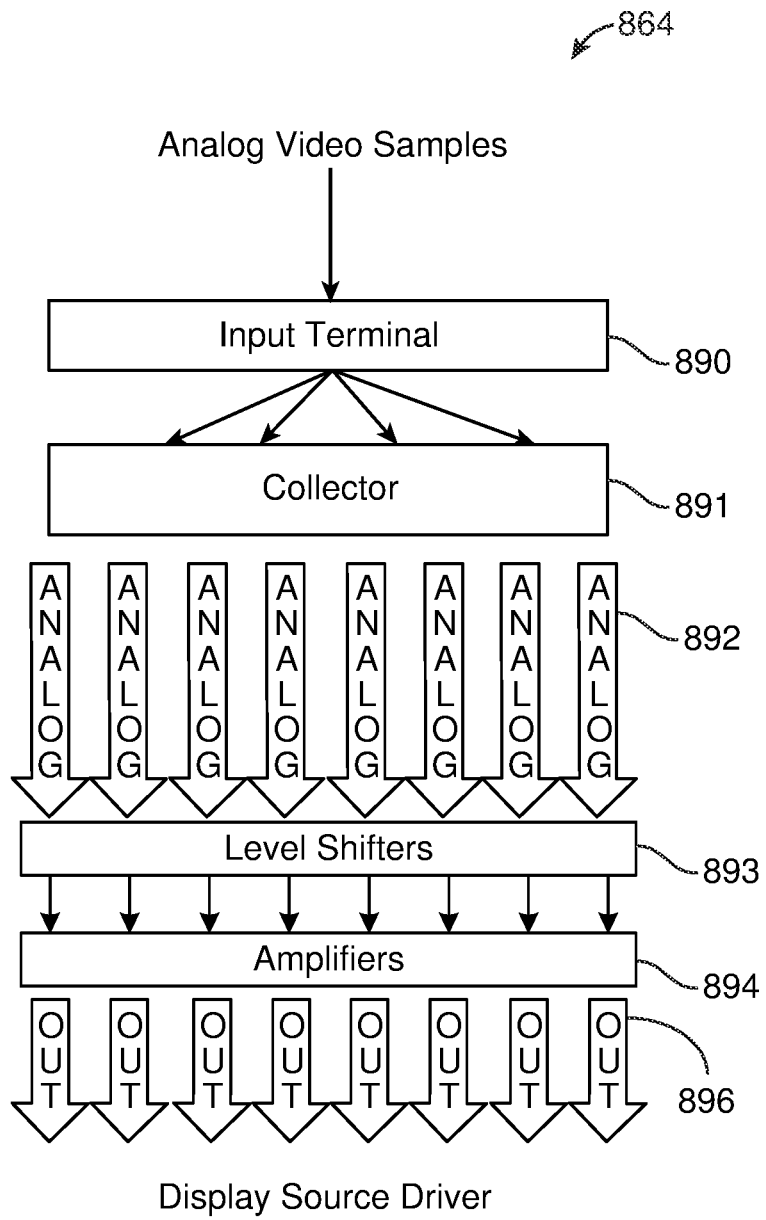
FIG. 20 illustrates a source driver architecture of a display panel 850 that accepts analog video samples output from an OFDM receiver.

FIG. 20 illustrates an example of a source driver 864 of a display panel 850 that accepts analog video samples output from an OFDM receiver. Other source driver architectures are also possible. Source driver 864 will typically have 900 to 1,000 outputs, or more. There may be multiple instances of this source driver within a display. The analog video samples output from an OFDM receiver are input at input terminal 890 and then delivered in parallel to a collector 891 which outputs the analog samples 892 in parallel to the column drivers which typically include level shifters 893 and amplifiers 894, before being output 896 to the columns.

Amplifiers 894 amplify each analog sample in order to produce the voltage required for the particular display panel. The polarity signal and reference voltages (i.e., rail voltages for the amplifiers from gamma encoding, used to produce a dynamic range of voltages expected or required by the display panel) are provided to each of the amplifiers. Gamma processing and encoding may be performed within the SoC or timing controller chip. Outputs 896 are output onto the display columns, i.e., directly onto the glass of the display, in order to drive the sources of each pixel as is known in the art. Advantageously, each source driver 864 needs no DACs for converting pixel data, thus saving space, reducing power required, etc.

Orthogonal Frequency Division Multiplexing Video Transport with Distributor

Above is described an OFDM transport technique showing single OFDM paths in FIGS. 15 and 16, and multiple OFDM paths in FIG. 17. The below describes an improved technique in which a distributor is incorporated into a transmitter (and a collector into a receiver) in order to facilitate multiple transmission paths within a display unit or to a display unit.

In a first variation of this embodiment, an SAVT signal or signals are produced from one or more video signals and each SAVT signal is then input into an OFDM transmitter for transmission over an EM pathway to be received at an OFDM receiver and then displayed on a display.

Figure 21:
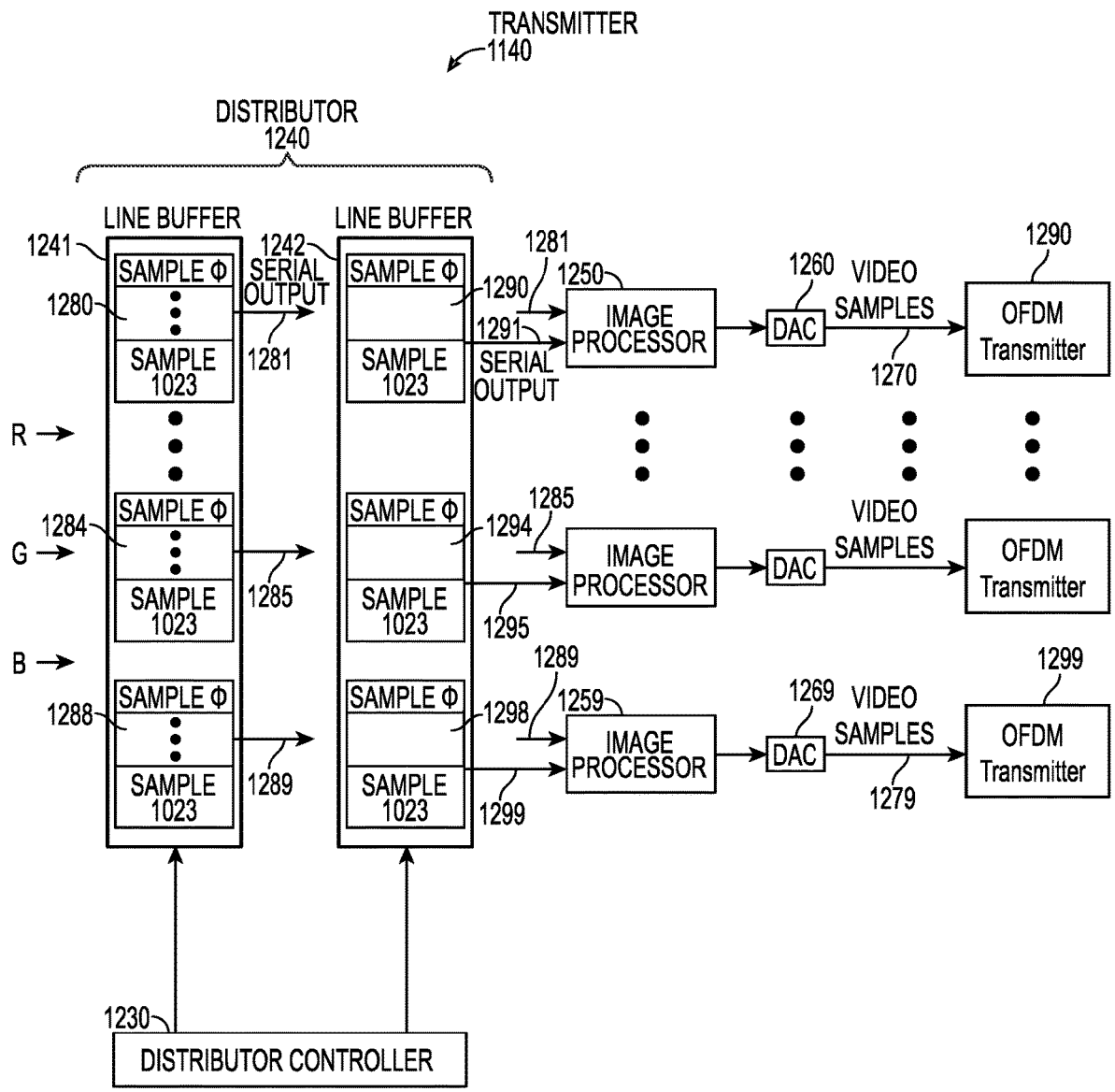
FIG. 21 shows an architecture of a transmitter which may be external to or within a display unit.

FIG. 21 shows an architecture of a transmitter 1140 which may be external to or within a display unit. Shown is a distributor 1240 that includes two line buffers 1241, 1242 and a distributor controller 1230, a number of P image processors 1250-1259, a digital-to-analog converter 260-269 following each image processor, and streams of video samples 270-279 output from each DAC. In this example there are 24 source drivers, meaning 24 streams, or P=24. It should be understood that there may be a single EM pathway (i.e. P=1) or multiple EM pathways.

During operation, video signals (e.g. RGB) containing time-ordered digital video samples containing color values and pixel-related information is received from a video source and delivered to the transmitter 1140 (via the SoC and TCON if within a display unit). The number and content of the input video samples received from the video source depends upon the color space in operation at the source (and, the samples may be in black and white). Regardless of which color space is used, each video sample is representative of a sensed or measured amount of light in the designated color space.

Pixel values may come in row-major order through successive video frames. More than one pixel value may arrive at a time (e.g., two, four, etc.); they are serial in the sense that groups of pixels are transmitted progressively, from one side of the line to the other. A processing unit such as an unpacker of a timing controller may be used to unpack (or expose) these serial pixel values into parallel RGB values, for example. Also, it should be understood that the exposed color information for each set of samples can be any color information (e.g., Y, C, Cr, Cb, etc.) and is not limited to RGB. The number of output sample values S in each set of pixel samples is determined by the color space applied by the video source. With RGB, S=3, and with YCbCr 4:2:2, S=2. In other situations, the sample values S in each set of samples can be just one or more than three.

In general, as input digital video samples in one or more video signals (e.g., RGB) are received within the transmitter 1140 in row-major order (for example), the input digital video samples are repeatedly (1) distributed to one of the output streams according to a predetermined permutation (in this example, row-major order, i.e., the identity permutation) (2) optionally processed using standard image processing techniques such as gamma correction, etc., (3) converted into analog, and (4) output as a stream of video samples, one stream per OFDM transmitter, as described below. An OFDM receiver receives each OFDM-encoded stream and outputs a stream of analog samples to a source driver. At each source driver the samples are received at an input terminal and each analog sample in turn is distributed via sampling circuitry to a storage cell of a particular column driver using the inverse of the predetermined permutation used in the transmitter. Once all samples for that source driver are in place they are driven onto the display panel. As a result, the original time-ordered video samples containing color and pixel-related information is conveyed from video source to video sink. The inverse permutation effectively stores the incoming samples as a row in the storage array (for display on the panel) in the same order that the row of samples was received at the distributor.

In one embodiment, four control signals for every 60 video samples are inserted into the stream of samples in the distributor to be sent to the source driver. As shown, each input vector 1280 in the line buffer includes a total of 1,024 values, including the four control signals per every 60 video samples. The control signals may be inserted into various positions in the input vector, by way of example, "samples" 960-1023 of the input vectors 1280-1288 may actually be control signals. Any number of control signals in each input vector may be used. Further, an arbitrary but finite number of control signals is possible. The more control signals that are transmitted, the higher the data transmission rate needed.

Ideally, the number of control signals is limited to what fits into the blanking periods so that there can be a correspondence between transmit rate and displayed lines (thus reducing the amount of storage required, or any additional re-synchronization). And further, the control signals may be inserted into the stream of samples at the distributor or insertion of control signals be performed in another location.

Distributor 1240 is arranged to receive the pixel color information (e.g., R, G, and B values) exposed in the input sets of samples. The distributor 1240 takes the exposed color information and writes multiple input vectors 1280-1288 into the first line buffer 1241 (one input vector per OFDM transmitter) according to the predefined permutation. Once line buffer 1241 is full then each input vector 1280-1288 is read out via its corresponding serial output port 1281-1289 into its corresponding image processor 1250-1259. As these input vectors from line buffer 1241 are being read out (or once line buffer 1241 is full) then the next line of RGB input samples are written into input vectors 1290-1298 in the second line buffer 1242. Thus, once the second line buffer 1242 is full (and the image processors have finished reading input vectors from the first line buffer 1241) the image processors begin reading samples from the second line buffer 1242 via their serial output ports 1291-1299. This writing to, and reading from, the first and second line buffers continues in this "ping-pong" fashion as long as input samples arrive at the transmitter.

Distributor controller 1230 controls the operation and timing of the line buffers. In particular, the controller is responsible for defining the permutation used and the number of samples N when building the four input vectors. In this example, N=1024. Controller 1230 may also include a permutation controller that controls distribution of the RGB samples to locations in the input vectors. The controller is also responsible for coordinating the clock domain crossing from a first clock frequency to a second clock frequency.

In one particular embodiment, each line buffer 1241 or 1242 has three input ports for the incoming RGB samples and the samples are clocked in at a frequency of FPIXEL; each line buffer also has 24 output ports, e.g., 1281 or 1291 (in the case where there are 24 OFDM transmitters, each being sent to one of 24 source drivers) and the samples are clocked out serially from each input vector at a sampled analog video transport (SAVT) frequency of FSAVT. It is also possible to clock in two R, two G and two B samples at a time instead of one each, or three at a time, etc. In one embodiment, FSAVT=663.552 MHz for 24 channels.

For purposes of explanation, one possible permutation is one in which each of the input vectors includes N samples of color information and control signals. The exposed RGB samples of the sets of samples in this example are assigned to input vectors from left to right. In other words, the "R", "G" and "B" values of the first set of samples, the "R", "G" and "B" values of the next set of samples, etc. are assigned to input vector 1280 in that order (i.e., RGBRGB, etc.). Once input vector 1280 has been assigned its N samples and control signals, the above process is repeated for the other input vectors in order until each of the input vectors have N values. The number of N values per input vector may widely vary. As shown in this example, this predetermined permutation preserves the row-major order of the incoming samples, that is, the first input vector 1280 includes sample0 through sample1023 of the first row in that order and the succeeding input vectors continue that permutation (including control signals). Thus, distributor controller 1230 performs a permutation by assigning the incoming samples to particular addresses within the line buffer. It should also be understood that any permutation scheme may be used by the distributor 1230; and, whichever permutation scheme that is used by the transmitter, its inverse will be used by control logic in each source driver in order to distribute the incoming samples to the column drivers.

Image processors 1250-1259 then performs the following for each input vector: a) applies gamma correction on each sample; b) level shifts each gamma-corrected sample, mapping the range (0 . . . 255) to (−128 . . . 127), in order to remove the DC component from the signal; c) applies the path-specific amplifier variance correction to each gamma-corrected, level-shifted sample; performs gain compensation for each sample; performs offset adjustment for each sample; and performs demura correction for each sample. Other corrections and adjustments may also be made depending upon the target display panel. An individual image processor 1250-1259 may process each serial output stream of samples (e.g., 1281 and 1291) or a single, monolithic image processor may handle all serial outputs (e.g., 1281 and 1291, 1285 and 1295, etc.) at once. In order to avoid performing image processing on the control signals in the line buffer, the control signal timing and positions in buffers is known so that logic can determine that image processing of control signals should not be done. As mentioned above, image processing need not occur within transmitter 1140 but may occur in a SoC or elsewhere.

After the image processing (if present), the modified digital samples of each input vector are input serially into one of DACs 1260-1269; each DAC converts these modified digital samples at a frequency of FSAVT and outputs streams of analog samples 1270-1279 into OFDM transmitters 1290-1299 as described below. Each DAC converts its received sample from the digital domain into an analog sample (e.g. a differential pair of voltage signals having a magnitude that is proportional to its incoming digital value); the output of the DACs may range from a maximum voltage to a minimum voltage.

Although two line buffers are shown within distributor 1240 (which is preferable), it is possible to use a single line buffer and as samples from a particular input vector are being read into its image processor (or its DAC) the distributor back fills that input vector with incoming samples such that there is no pause in the serial delivery of samples from the line buffer to the image processor. Further, and also less desirable, it is also possible to place each DAC after the distributor and before the image processors (if any), thus performing image processing on analog samples.

In this first variation, each OFDM transmitter 1290-1299 may be a transmitter as shown in FIG. 16 that receives analog video samples and transmits an OFDM signal 690, such as at transmitter 610 or 700b. Signal 690 is then received at an OFDM receiver 834 which outputs the corresponding analog video samples to a video sink. These samples are then displayed on a display panel. Typically, an OFDM receiver will be in conjunction with, and may be within, a source driver of the panel. The following figures show an embodiment of such a source driver.

Figure 22:
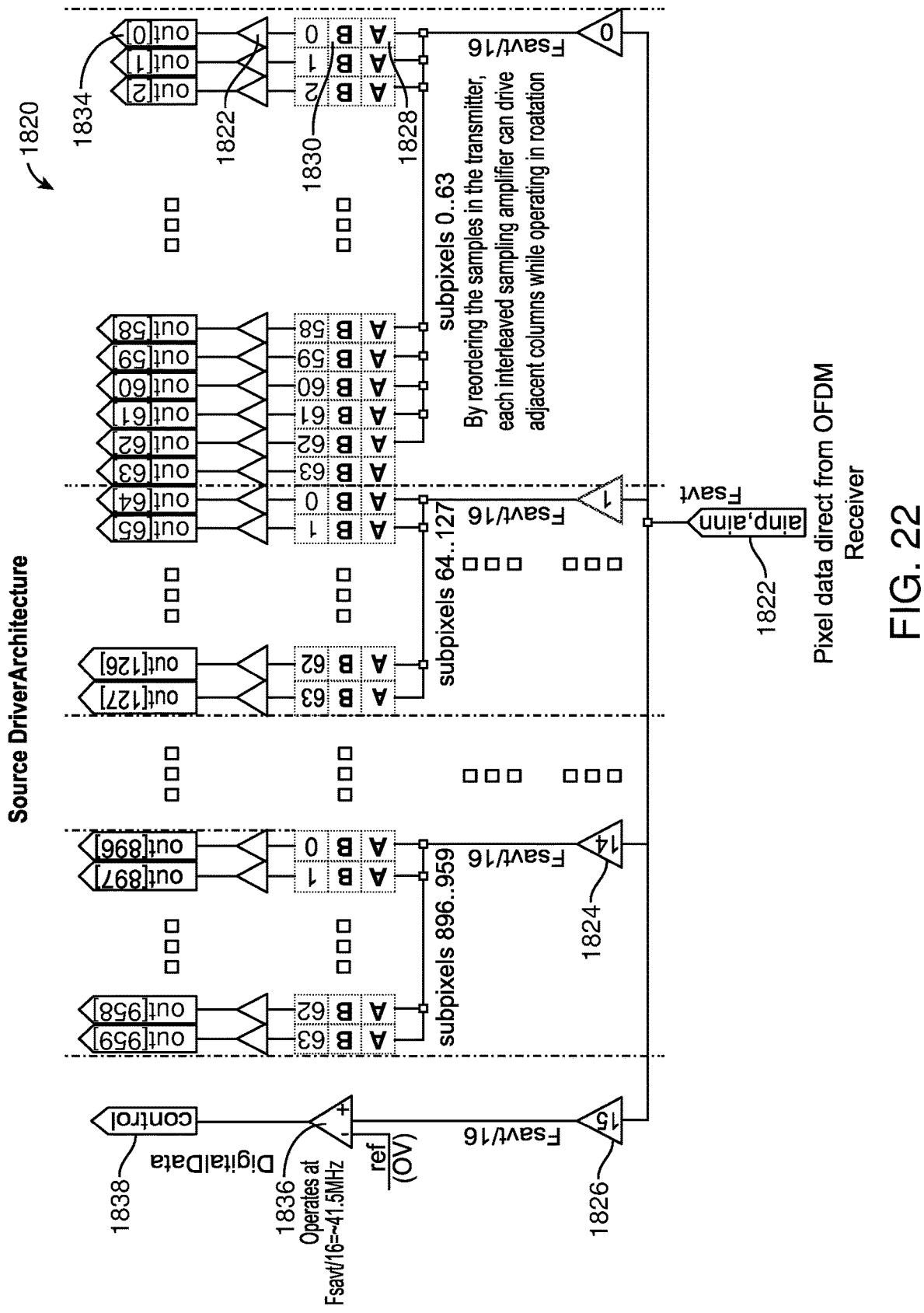
FIG. 22 illustrates a preferred architecture of a source driver in which each distributor amplifier drives adjacent columns and all control signals are handled by a single amplifier.

FIG. 22 illustrates a preferred architecture of a source driver in which each distributor amplifier drives adjacent columns and all control signals are handled by a single amplifier. Shown is an input terminal 1822 which de-multiplexes and distributes the incoming pixel data and control signals from the OFDM receiver 834 to S/H amplifiers 1824 (inputting the pixel data numbered from 0 to 14) and to amplifier 1826 which receives the control signals. The pixel data from amplifiers 1824 is transferred to either storage array A 1828 or to storage array B 1830 as is described above and the control signal is handled by component 1836 and output at 1838. The pixel data from either storage array is then input into column drivers 1832 and output onto the columns 1834 as known in the art. Not shown is control logic for controlling the timing of the input amplifiers, storage arrays and column drivers. As the pixel data is received sequentially on a single channel (per chip), it is stored into the A/B collectors sequentially (one Fsavt cycle apart), although it is also possible to store 15 sub-pixels into the array in parallel from the 15 SHA amplifiers.

Thus, 15 interleaved S/H amplifiers receive the incoming pixel data and each drives 64 columns which are adjacent, i.e., 64 video tracks, thereby minimizing the span of columns that are driven by each amplifier. This architecture provides 15 blocks of 64 video samples plus one sub-band channel (control signals) of 64 bits per display line (per source driver). For example, amplifier 0 drives columns 0-63, the second amplifier drives columns 64-127, etc., the 15th amplifier drives columns 896-959 and amplifier 1826 drives the control signals. Having all control signals on one channel means no difference in amplitude, delays or other from one signal to the next (if they were on different channels). It is also possible that the control signals arrive on channel zero (i.e., amplifier 0) instead of amplifier 15; that is advantageous in that the control information arrives earlier than the pixel data. Another advantage of this architecture is that control signal extraction needs to look at only one de-interleaving amplifier output rather than be distributed across all amplifiers, simplifying synchronization.

In this figure there are 15 video amplifiers, each driving 64 subpixels=960 subpixels/chip. There is one channel devoted to control, carrying 64 symbols per line (per source driver). As shown, the control channel receives a control signal at amplifier 1826 which is input to comparator 1836 having a reference voltage of 0 V and operating at a 16th of FSAVT or approximately 41.5 MHz. Assuming that the control signals are in the range of −0.5 V up to +0.5 V, the comparator will detect if the control signal is greater than 0 V (meaning a digital 1) or if the control signal is less than 0 V (meaning a digital zero). This digital data is then output at 1838 and thus provides a single control bit every 16 samples. Control signals provide synchronization and phase alignment as described below.

Typically, there may be 24 such source drivers of a display panel, i.e., P equals 24. Note that no analog-to-digital converters (ADCs) are needed in the source driver in order to convert samples to analog for display. Table 1 shows parameters, values and units of the source driver for use with an 8K144 display panel. Thus, each of 24 source drivers drives 960 columns, providing the sub-pixels for a row of the display (23,040 sub-pixels per line). One of skill in the art will find it straightforward to modify the architecture to suit other display sizes and speeds. By reordering the samples in the transmitter, each interleaved S/H amplifier can drive adjacent columns while operating in rotation as is described below.

TABLE 1

| 8K144 Example Values | | |
|---|---|---|
| Parameter | Value | Units |
| Hpix | 7680 | Pixels |
| Vpix | 4500 | Pixels |
| Screen Refresh | 144 | H$_2$ |
| RxChips | 24 | Chips/system |
| Hsubpix | 23040 | Subpixels/line |

TABLE 1-continued

| 8K144 Example Values | | |
|---|---|---|
| Parameter | Value | Units |
| SubpixRate | 149299200000 | Samples/sec |
| SubpixelOverhead | 1.067 | = 64/60 (synch & Control Overhead) |
| SampleRate | 15925248000 | Samples/sec |
| Rate Per Chip | 663552000 | Samples/sec/chip |

Figure 23:
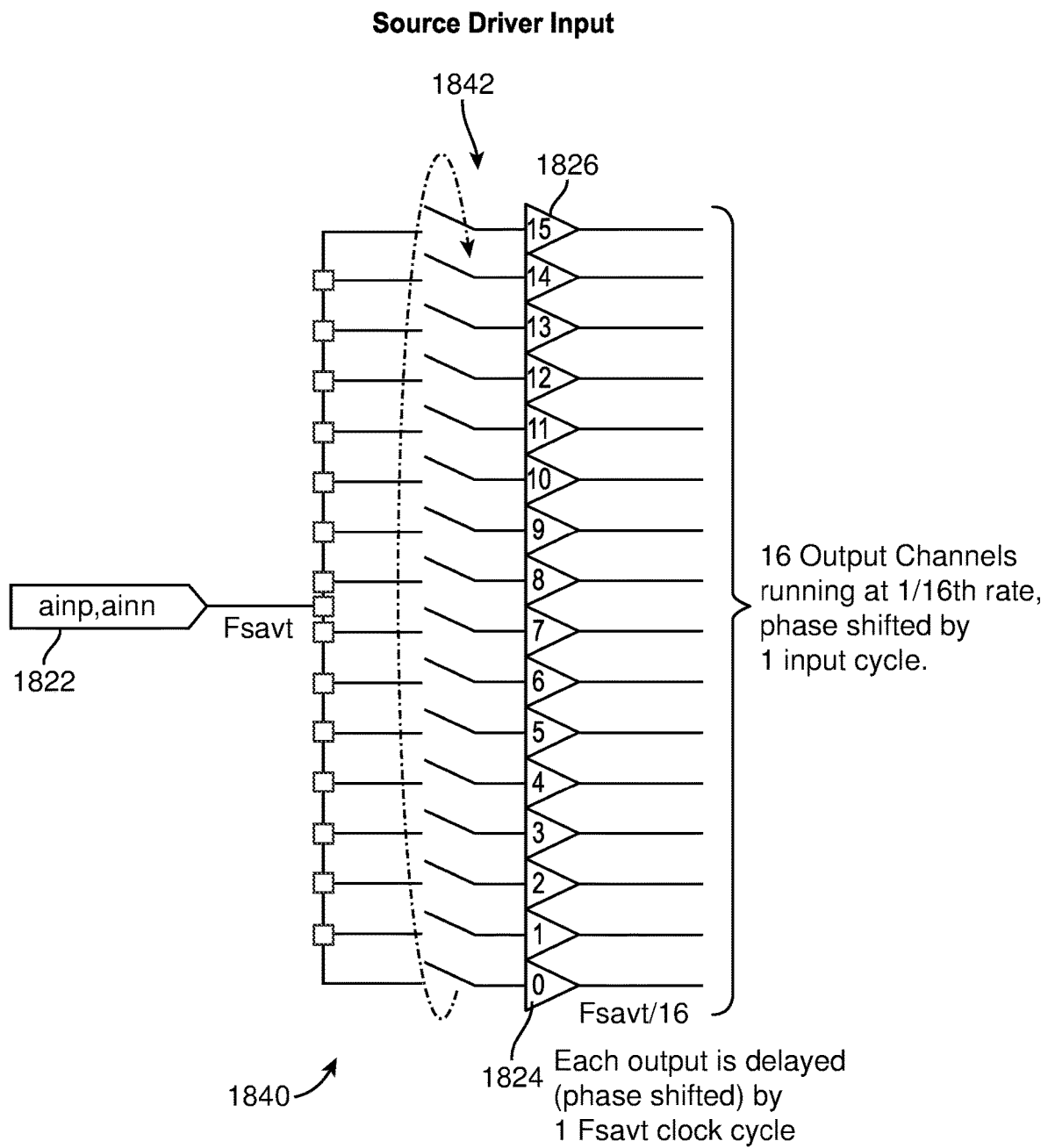
FIG. 23 illustrates a source driver input of source driver for interleaving multiple input amplifiers.

FIG. 23 illustrates a source driver input of source driver 1820 for interleaving multiple input amplifiers which allows speed requirements to be met. (It is possible to use a single amplifier but transmission speed would be reduced.) Shown is the input terminal 1822, distribution amplifiers 0-14 1824 and amplifier 1826 and an associated switch 1842 which rotates in order to effectively connect one amplifier at a time to receive one of the incoming sub-pixels or control signal, as the case may be. Thus, the input is interleaved 16 ways and the outputs of the switch are de-multiplexed into 16 channels running at $1/16$ the data rate. Each of the 960 sub-pixels in a line are conveniently grouped into 15 groups of 64 sub-pixels each and one channel is dedicated for detection of, and handling of, control signals.

Figures 24, 25:
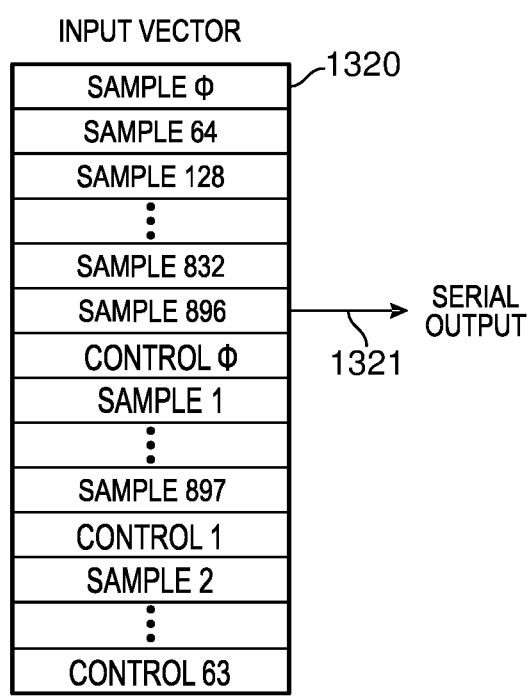
FIG. 24 is a summary of a pixel transmission order showing how pixels and control signals are transmitted from an input vector of transmitter to the source driver of FIG. 22.
FIG. 25 is a block diagram of an input vector of a transmitter having a predetermined permutation that provides for the sequence of sub-pixel transmission required by FIG. 24.

FIG. 24 is a summary of a pixel transmission order 1300 showing how pixels 0-959 and control signals 0-63 are transmitted from an input vector of transmitter 1140 (via one of OFDM transmitters 1290-1299) to the source driver of FIG. 22 and to which amplifier each is assigned. Shown is the natural order of sub-pixels as delivered via CEDS (clock-embedded differential signaling), for example, the sub-pixels arriving as read from left-to-right and then from top-to-bottom. Because of the 16-way interleaving of the input data at the source driver, the preferred method of transmitting the sub-pixels to the source driver is starting at the top left from top-to-bottom and then from left-to-right, i.e., the indices of the sub-pixels (and control signals) transmitted are 0, 64, 128, etc. Shown are indices for the S/H amplifiers 1302, an example of a sub-pixel index 1304 and control track 1306 of the 16th amplifier.

In this permutation, 15 of the amplifiers (0-14) each drive 64 adjacent columns with sub-pixel values, while amplifier 15 handles all 64 of the control signals. This variation minimizes the hardware in the source driver and also minimizes the wiring load on the input amplifiers. Further, this variation allows for the slowest possible SAVT (Sampled Analog Video Transport) transmission rate as padding is not required in the data sequences. In order to best display text and other sharp transitions in intensity, it is preferable that the sampling amplifiers should be able to settle to a new value every 1/Fsavt, or approximately 1.5 ns per sample. In order to implement this architecture, the sequence of sub-pixel indices for transmission in a transmitter is: 0, 64, 128, . . . 832, 896; 1, 65, . . . 897; . . . ; 63, 127, 191, . . . 895, 959.

FIG. 25 is a block diagram of an input vector 1320 of a transmitter having a predetermined permutation that provides for the sequence of sub-pixel transmission required by FIG. 24. As described earlier, as the sub-pixels arrive in the distributor 1240 they are distributed into input vector 1320 in the order shown. When full, the samples in the input vector are then output serially via output port 1321 to an image processor as described above, converted and then transmitted to a source driver having an architecture as is described in FIG. 22. Not shown are other input vectors of the line buffer; each input vector will have a similar permutation and the other source drivers corresponding to each input vector will have the same architecture as shown in FIG. 22. The above architecture of source driver 1820 along with the above transmission order provides the advantages above and also retains the slowest possible SAVT clock rate.

Figure 26:
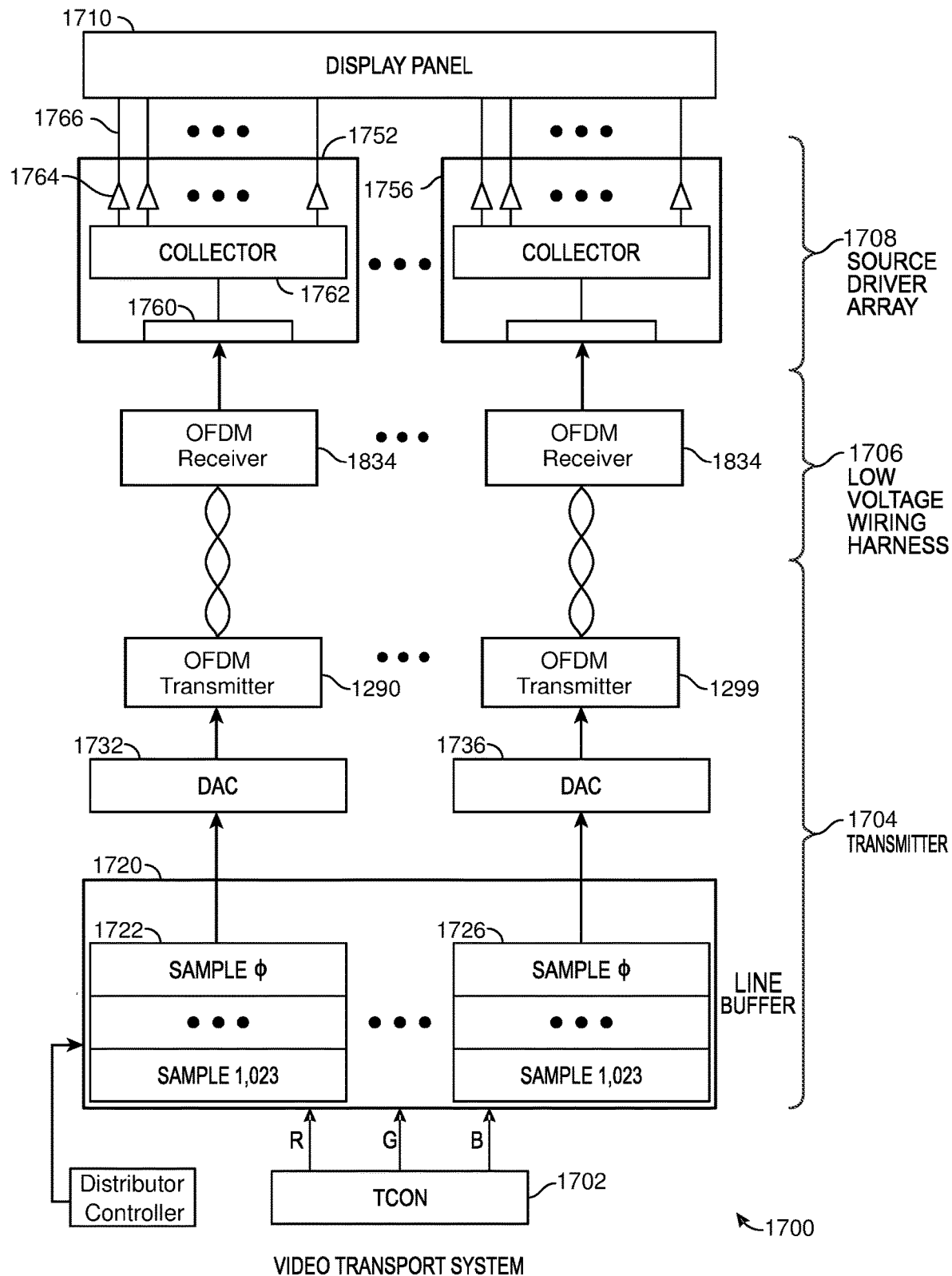
FIG. 26 illustrates a video transport system within a display unit.

FIG. 26 illustrates a video transport system 1700 within a display unit. In this first variation of OFDM transport with a distributor as shown, the inputs to the OFDM transmitters are analog samples and the outputs from the OFDM receivers are the same analog samples, thus, advantageously, no DACs or ADCs are needed within the transmitters or receivers, and no DACs are needed within the source driver array for converting pixel values. Shown is a timing controller 1702 that outputs sets of color samples as described above, such as sub-pixel values in digital form representing brightness values from an image or video to be displayed upon display panel 1710. The samples are input into a transmitter 1704, and transmitted over a low-voltage wiring harness 1706 to a source driver array 1708 for display upon display panel 1710.

A distributor of the transmitter includes line buffer 1720, any number of input vectors (or banks) 1722-1726, and a distributor controller 1728. The RGB samples (or black-and-white, or any other color space) are received continuously at the distributor and are distributed into the input vectors according to a predetermined permutation which is controlled by the distributor controller 1728. In this example, a row-major order permutation is used and the first portion of the row of the incoming video frame (or image) from left to right is stored into input vector 1722, and so on, with the last portion of the row being stored in input vector 1726. Accordingly, line buffer 1720 when full, contains all of the pixel information from the first row of the video frame which will then be transported and displayed in the first line of a video frame upon display panel 1710. Each input vector is read out serially into its corresponding DAC 1732-1736 and each sample is converted into analog for OFDM and transport. As samples arrive continuously from timing controller 1702 they are distributed, converted, transported and eventually displayed as video upon display panel 710.

Connecting each OFDM transmitter and corresponding OFDM receiver is a low-voltage wiring harness 1706 consisting of differential wire pairs, each wire pair transporting a continuous stream of analog samples (an electromagnetic signal). Each differential wire pair terminates at the input 1760 of one of the source drivers 1752-1756. Other transmission media (e.g., cable, wireless, optical) instead of differential pairs in a wiring harness are also possible.

Each source driver of the source driver array such as source driver 1752 includes an input terminal 1760, a collector 1762 and a number of column drivers 1764 (corresponding to the number of samples in each input vector, in this example, 1,024). Samples are received serially at the terminal 1760 and then are collected into collector 1762 which may be implemented as a one-dimensional storage array or arrays having a length equal to the size of the input vector. Each collector may be implemented using the storage arrays shown in FIG. 22. Once each collector is full, then all collected samples are output in parallel into all of the column drivers 1764 of all source drivers, amplified to the appropriate high-voltage required by the display panel, and output onto columns 1766 using a single-ended format. As samples arrive continuously over the wiring harness, each collector continues to collect samples and output them to the display panel, thus affecting presentation of video. In one embodiment, each collector 1762 is implemented using the A/B storage cells of FIG. 22. In other words, each column of the collector will have a pair of input samplers. The SHA amplifiers may be considered part of collector 762.

In a second variation of OFDM transport with a distributor, incoming digital video samples are maintained as digital, the input to the OFDM transmitters are digital samples, and the output from the OFDM receivers are the digital video samples which may be converted into analog video samples as the case may be. Accordingly, to implement this second variation the transmitter of FIG. 21 is modified to remove the DACs 1260-1269 so that the input to each OFDM transmitter is the series of digital video samples from each corresponding input vector. This transport may be implemented for each transmitter as shown in FIG. 15 in which digital video samples 812 are input into an OFDM transmitter 80 or 700a, transmitted to an OFDM receiver 814 which may then output digital video samples 816. As shown in FIG. 18, the OFDM receiver 814 outputs the digital video samples which may be used directly by a display panel which requires (and has the capability to convert to analog) digital video samples, or a DAC 870 may be included within the OFDM receiver in order to provide analog video samples required by a source driver of a display panel. If analog video samples are output by the OFDM receiver they may be processed and displayed as described above with reference to FIGS. 22-25. If this second variation is implemented within a display unit (such as shown in FIG. 26) then DACs 1732 and 1736 are eliminated and the input to OFDM transmitters 1290-1299 are digital samples. OFDM receivers 834 are instead implemented as receivers 814 and may include DAC 870 in order to output analog video samples to each source driver if the source drivers require analog samples.

In a third variation of OFDM transport with a distributor, the incoming video signals include analog video samples, i.e. the RGB signals of FIG. 21 include analog video samples not digital samples. The input to the OFDM transmitters are analog samples and the output from the OFDM receivers are the analog video samples (which may be converted into digital video samples if desired). Accordingly, to implement this third variation the transmitter of FIG. 21 is modified to accept incoming analog video samples, the DACs 1260-1269 are removed and input to each OFDM transmitter 1290-1299 is a series of analog video samples from the corresponding input vector. This transport may be implemented for each transmitter as shown in FIG. 16 in which analog video samples 832 are input into an OFDM transmitter 610 or 700b, transmitted to an OFDM receiver 834 which may then output analog video samples 836. The OFDM receiver 834 outputs the analog video samples which may be used directly by a display panel. These analog video samples may be processed and displayed as described above with reference to FIGS. 22-25. If this third variation is implemented within a display unit (such as shown in FIG. 26) then the samples in the RGB signals are analog video samples, DACs 1732 and 1736 are eliminated and the input to OFDM transmitters 1290-1299 are analog samples. OFDM receivers 834 output analog video samples to each source driver.

OTHER EMBODIMENTS

Other embodiments include the following.

1. A transmitter for transmitting input digital samples, said transmitter comprising:
   an encoder that continuously inputs an input vector of N digital samples and encodes said N digital samples using N orthogonal spreading codes each of length L in order to output L digital levels, each of said codes used with one of said N digital samples and wherein L>=N>=2;

symbol mapping circuitry that receives a continuous stream of said L digital levels from said encoder and maps said L digital levels to points in a constellation to obtain pairs of in-phase (I) components and out-of-phase (Q) components, and outputs each pair of I and Q components into a bin of an inverse fast Fourier transform (IFFT) block; and orthogonal frequency division multiplexing (OFDM) circuitry that performs an IFFT on said IFFT block and uses OFDM to produce an electromagnetic signal representing said continuous stream of digital levels.

2. A transmitter as recited in embodiment 1 wherein said N digital samples originate at a single source and wherein said electromagnetic pathway terminates at a single sink.

3. A transmitter as recited in embodiment 1 wherein said electromagnetic pathway terminates at a display panel of a display unit and wherein said transmitter is located within said display unit.

4. A transmitter as recited in embodiment 1 wherein said encoder synchronously encodes said N digital samples into said L digital levels, wherein said N digital samples are represented by said L digital levels.

5. A transmitter as recited in embodiment 1 wherein said symbol mapping circuitry maps each of said L digital levels to a point in said constellation to obtain said in-phase (I) component and out-of-phase (Q) components.

6. A transmitter as recited in embodiment 1 wherein for each pair of said I and Q components output into said bin of said IFFT block, the complex conjugate of said I and Q components is output into a corresponding bin of said IFFT block that is symmetric with respect to a middle frequency of sub-carrier frequencies used in said transmitter, and wherein an output of said IFFT is a real value and not a complex value.

7. A transmitter as recited in embodiment 1 wherein each digital level received by said symbol mapping circuitry includes most significant bits (MSBs) and least significant bits (LSBs), wherein for each digital output level received, said symbol mapping circuitry distributes said MSBs of said each digital output level to the MSBs of the in-phase (I) component and to MSBs of the out-of-phase (Q) component, wherein for each digital output level received, said symbol mapping circuitry distributes said LSBs of said each digital output level to the LSBs of the in-phase (I) component and to the LSBs of the out-of-phase (Q) component, and wherein said symbol mapping circuitry outputs said I and Q components as a complex number into a bin of an inverse fast Fourier transform (IFFT) block until said IFFT block is full.

8. A transmitter as recited in embodiment 1 further comprising:

a digital-to-analog converter that accepts said electromagnetic signal and outputs an analog signal on said electromagnetic pathway.

9. A transmitter as recited in embodiment 1, said transmitter being one of a plurality of P transmitters, each of said P transmitters producing an electromagnetic signal, said electromagnetic signal signals representing a media signal from a single source.

10. A receiver for outputting digital samples, said receiver comprising:

orthogonal frequency division multiplexing (OFDM) circuitry that receives an OFDM electromagnetic signal and performs a fast Fourier transform (FFT) on received OFDM symbols to fill bins of an FFT block each with a digital in-phase (I) component and a digital out-of-phase (Q) component of a complex number for each OFDM symbol;

reverse symbol mapping circuitry that inputs said I components and said Q components and continuously converts said I components and said Q components into digital input levels in accordance with symbol mapping circuitry of a corresponding OFDM transmitter; and a decoder that continuously inputs L of said digital input levels and decodes said L digital input levels using N orthogonal spreading codes each of length L in order to output an output vector of N digital samples, each of said codes used with one of said N digital samples and wherein L>=N>=2.

11. A receiver as recited in embodiment wherein said N digital samples originate at a single source and wherein said electromagnetic pathway terminates at a single sink.

12. A receiver as recited in embodiment wherein said electromagnetic pathway terminates at a display panel of a display unit and wherein said corresponding OFDM transmitter is located within said display unit.

13. A receiver as recited in embodiment wherein said decoder synchronously decodes said L digital input levels into said N digital samples, wherein said N digital samples represent said L digital input levels.

14. A receiver as recited in embodiment wherein said reverse symbol mapping circuitry converts each point in a constellation to one of said digital input levels.

15. A receiver as recited in embodiment wherein said reverse symbol mapping circuitry places the most significant bits (MSBs) of each pair of a digital I component and a digital Q component into the MSBs of one of said digital input levels and places the least significant bits (LSBs) of said each pair into the LSBs of said one digital input level.

16. A receiver as recited in embodiment wherein an input to said FFT is a real value and not a complex value, wherein said bins of said FFT block are filled with said I and Q components on one side of a middle frequency of sub-carrier frequencies used in said receiver and wherein said bins of said FFT block are filled with the complex conjugate of corresponding said I and Q components symmetrically on the other side of said middle frequency, and wherein said reverse symbol mapping circuitry only inputs said I and Q components from bins on said one side.

17. A receiver as recited in embodiment wherein said OFDM circuitry includes at least one analog-to-digital converter that produces said digital I and Q components.

18. A transmitter for transmitting input analog samples, said transmitter comprising:

an encoder that continuously inputs an input vector of N analog samples and encodes said N analog samples using N orthogonal codes each of length L in order to output L analog levels, each of said codes used with one of said N analog samples and wherein L>=N>=2;

switch circuitry that receives said continuous stream of L analog levels, wherein for every pair of analog levels received, said switch circuitry outputs a first analog level of said pair as an in-phase (I) component and outputs a second analog level of said pair as an out of-phase (Q) component into a bin of an inverse fast Fourier transform (IFFT) block; and orthogonal frequency division multiplexing (OFDM) circuitry that receives said pairs of I and Q components, performs an IFFT on said IFFT block and uses OFDM to produce an electromagnetic signal representing said continuous input of analog samples.

19. A transmitter as recited in embodiment wherein said N analog samples originate at a single source and wherein said electromagnetic pathway terminates at a single sink.

20. A transmitter as recited in embodiment wherein said electromagnetic pathway terminates at a display panel of a display unit and wherein said transmitter is located within said display unit.

21. A transmitter as recited in embodiment wherein said encoder synchronously encodes said N analog samples into said L analog levels, wherein said N analog samples are represented by said L analog levels.

22. A transmitter as recited in embodiment wherein said transmitter does not include a constellation for mapping.

23. An OFDM transmitter as recited in embodiment wherein for each pair of said I and Q components output into said bin of said IFFT block, the complex conjugate of said I and Q components is output into a corresponding bin of said IFFT block that is symmetric with respect to a middle frequency of sub-carrier frequencies used in said transmitter, and wherein an output of said IFFT is a real value and not a complex value.

24. A transmitter as recited in embodiment wherein said transmitter does not include a digital-to-analog converter.

25. A transmitter as recited in embodiment, said transmitter being one of a plurality of P transmitters, each of said P transmitters producing an electromagnetic signal, said electromagnetic signals representing a media signal from a single source.

26. A receiver for outputting analog samples, said receiver comprising:
    orthogonal frequency division multiplexing (OFDM) circuitry that receives an OFDM electromagnetic signal and performs a fast Fourier transform (FFT) on received OFDM symbols to fill bins of an FFT block each with an in-phase (I) component and an out-of-phase (Q) component of a complex number; and
    combining circuitry that inputs for each bin said I component and said Q component of said each bin and outputs said I and Q components as a first analog level and a second analog level in order to output a continuous stream of analog input levels; and
    a decoder that continuously inputs L of said analog input levels and decodes said L analog input levels using N orthogonal spreading codes each of length L in order to output an output vector of N analog samples, each of said codes used with one of said N analog samples and wherein L>=N>=2.

27. A receiver as recited in embodiment wherein said N analog samples originate at a single source and wherein said electromagnetic pathway terminates at a single sink.

28. A receiver as recited in embodiment wherein said electromagnetic pathway terminates at a display panel of a display unit and wherein said corresponding OFDM transmitter is located within said display unit.

29. A receiver as recited in embodiment wherein said decoder synchronously decodes said L analog input levels into said N analog samples, wherein said N analog samples represent said L analog input levels.

30. A receiver as recited in embodiment wherein said receiver does not include a constellation for mapping.

31. A receiver as recited in embodiment wherein an input to said FFT is a real value and not a complex value, wherein said bins of said FFT block are filled with said I and Q components on one side of a middle frequency of sub-carrier frequencies used in said receiver and wherein said bins of said FFT block are filled with the complex conjugate of corresponding said I and Q components symmetrically on the other side of said middle frequency, and wherein said combining circuitry only inputs said I and Q components from bins on said one side.

32. A receiver as recited in embodiment wherein said receiver does not include an analog-to-digital converter.

32. A receiver as recited in embodiment, said receiver being one of a plurality of P receivers, each of said P receivers receiving an electromagnetic signal, said electromagnetic signals representing a media signal from a single source.

33. A transmitter for transmitting input digital video samples, said transmitter comprising:
    a serial-to-parallel converter arranged to receive a bit-serial stream of digital video samples and produce a parallel stream of said digital video samples, said digital video samples originating at an image sensor of a video source;
    symbol mapping circuitry that receives said stream of said digital video samples from said serial-to-parallel converter and maps each of said digital video samples to a point in a constellation to obtain pairs of in-phase (I) components and out-of-phase (Q) components, and outputs each pair of I and Q components into a bin of an inverse fast Fourier transform (IFFT) block; and
    orthogonal frequency division multiplexing (OFDM) circuitry that performs an IFFT on said IFFT block and uses OFDM to produce an electromagnetic signal representing said stream of digital video samples.

34. A transmitter as recited in embodiment wherein said OFDM circuitry being further arranged to transmit said electromagnetic signal to a video sink.

35. A transmitter as recited in embodiment wherein said transmitter is located within a display unit, and wherein said OFDM circuitry being further arranged to transmit said electromagnetic signal to a source driver of a panel of said display unit.

36. A transmitter as recited in embodiment wherein for each pair of said I and Q components output into said bin of said IFFT block, the complex conjugate of said I and Q components is output into a corresponding bin of said IFFT block that is symmetric with respect to a middle frequency of sub-carrier frequencies used in said transmitter, and wherein an output of said IFFT is a real value and not a complex value.

37. A transmitter as recited in embodiment wherein each digital video sample received by said symbol mapping circuitry includes most significant bits (MSBs) and least significant bits (LSBs), wherein for each digital video sample received, said symbol mapping circuitry distributes said MSBs of said each digital video sample to the MSBs of the in-phase (I) component and to MSBs of the out-of-phase (Q) component, wherein for each digital video sample received, said symbol mapping circuitry distributes said LSBs of said each digital video sample to the LSBs of the in-phase (I) component and to the LSBs of the out-of-phase (Q) component, and wherein said symbol mapping circuitry outputs said I and Q components as a complex number into a bin of an inverse fast Fourier transform (IFFT) block until said IFFT block is full.

38. A transmitter as recited in embodiment, said transmitter being one of a plurality of P transmitters each receiving a stream of digital video samples, wherein a distributor inputs digital video samples originating at said video source and distributes said digital video samples into said streams of digital video samples.

39. A receiver for outputting digital video samples, said receiver comprising:
orthogonal frequency division multiplexing (OFDM) circuitry that receives an OFDM electromagnetic signal representing a stream of digital video samples and performs a fast Fourier transform (FFT) on received OFDM symbols to fill bins of an FFT block each with a digital in-phase (I) component and a digital out-of-phase (Q) component of a complex number for each OFDM symbol;
reverse symbol mapping circuitry that inputs said I components and said Q components and continuously converts said I components and said Q components into a stream of digital video samples in accordance with symbol mapping circuitry of a corresponding OFDM transmitter; and
output circuitry arranged to output said stream of digital video samples, wherein said digital video samples originating at an image sensor of a video source.

40. A receiver as recited in embodiment further comprising:
a parallel-to-serial converter arranged to receive said stream of digital video samples and produce a bit-serial stream of said digital video samples to a video sink.

41. A receiver as recited in embodiment wherein said receiver is located within a display unit, said receiver further comprising:
a digital-to-analog converter arranged to input said stream of said digital video samples and to output a stream of analog video samples to a source driver of a panel of said display unit.

42. A receiver as recited in embodiment wherein said reverse symbol mapping circuitry converts each point in a constellation to one of said digital video samples.

43. A receiver as recited in embodiment wherein said reverse symbol mapping circuitry places the most significant bits (MSBs) of each pair of a digital I component and a digital Q component into the MSBs of one of said digital video samples and places the least significant bits (LSBs) of said each pair into the LSBs of said one digital video sample.

44. A receiver as recited in embodiment wherein an input to said FFT is a real value and not a complex value, wherein said bins of said FFT block are filled with said I and Q components on one side of a middle frequency of sub-carrier frequencies used in said receiver and wherein said bins of said FFT block are filled with the complex conjugate of corresponding said I and Q components symmetrically on the other side of said middle frequency, and wherein said reverse symbol mapping circuitry only inputs said I and Q components from bins on said one side.

45. A receiver as recited in embodiment, said receiver being one of a plurality of P receivers each outputting a stream of digital video samples, wherein a collector inputs said streams of digital video samples and outputs all of said streams collectively as a single stream of digital video samples to a display sink.

46. A transmitter for transmitting input analog video samples, said transmitter comprising:
input circuitry arranged to receive a stream of analog video samples, said analog video samples originating at an image sensor of a video source;
switch circuitry that receives said stream of said analog video samples, wherein for every pair of analog levels received, said switch circuitry outputs a first analog level of said pair as an in-phase (I) component and outputs a second analog level of said pair as an out-of-phase (Q) component into a bin of an inverse fast Fourier transform (IFFT) block; and
orthogonal frequency division multiplexing (OFDM) circuitry that receives said pairs of I and Q components, performs an IFFT on said IFFT block and uses OFDM to produce an electromagnetic signal representing said stream of said analog video samples.

47. A transmitter as recited in embodiment wherein said OFDM circuitry being further arranged to transmit said electromagnetic signal to a video sink.

48. A transmitter as recited in embodiment wherein said transmitter is located within a display unit, said transmitter further comprising:
a digital-to-analog converter arranged to input a stream of digital video samples and to output said stream of analog video samples to said input circuitry, wherein said OFDM circuitry being further arranged to transmit said electromagnetic signal to a source driver of a panel of said display unit.

49. A transmitter as recited in embodiment wherein said transmitter does not include a constellation for mapping.

50. An OFDM transmitter as recited in embodiment wherein for each pair of said I and Q components output into said bin of said IFFT block, the complex conjugate of said I and Q components is output into a corresponding bin of said IFFT block that is symmetric with respect to a middle frequency of sub-carrier frequencies used in said transmitter, and wherein an output of said IFFT is a real value and not a complex value.

51. A transmitter as recited in embodiment wherein said transmitter does not include a digital-to-analog converter.

52. A transmitter as recited in embodiment, said transmitter being one of a plurality of P transmitters each receiving a stream of analog video samples, wherein a distributor inputs analog video samples originating at said video source and distributes said analog video samples into said streams of analog video samples.

53. A receiver for outputting analog video samples, said receiver comprising:
orthogonal frequency division multiplexing (OFDM) circuitry that receives an OFDM electromagnetic signal representing a stream of analog video samples originating at an image sensor of a video source and performs a fast Fourier transform (FFT) on received OFDM symbols to fill bins of an FFT block each with an in-phase (I) component and an out-of-phase (Q) component of a complex number; and
combining circuitry that inputs for each bin said I component and said Q component of said each bin and outputs said I and Q components as a first analog video sample and a second analog video sample in order to output a stream of analog video samples, wherein said output stream of analog video samples correspond to said analog video samples originating at said image sensor of said video source.

54. A receiver as recited in embodiment being further arranged to output said stream of said analog video samples to a video sink.

55. A receiver as recited in embodiment wherein said receiver is located within a display unit, and wherein said receiver being further arranged to output said stream of said analog video samples to a source driver of a panel of said display unit.

56. A receiver as recited in embodiment wherein said receiver does not include a constellation for mapping.

57. A receiver as recited in embodiment wherein an input to said FFT is a real value and not a complex value, wherein said bins of said FFT block are filled with said I and Q components on one side of a middle frequency of sub-carrier frequencies used in said receiver and wherein said bins of said FFT block are filled with the complex conjugate of corresponding said I and Q components symmetrically on the other side of said middle frequency, and wherein said combining circuitry only inputs said I and Q components from bins on said one side.

58. A receiver as recited in embodiment wherein said receiver does not include an analog-to-digital converter.

59. A receiver as recited in embodiment, said receiver being one of a plurality of P receivers each outputting a stream of analog video samples, wherein a collector inputs said streams of analog video samples and outputs all of said streams collectively as a single stream of analog video samples to a display sink.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A source driver of a display unit, said source driver comprising:
    an input terminal arranged to receive a serial stream of analog video samples;
    a storage array including a plurality of registers each arranged to hold one of said analog video samples received from said input terminal; and
    a plurality of amplifiers each arranged to receive one of said analog video samples in parallel from one of said registers, to amplify said each analog video sample to a voltage in a voltage range expected by a display panel of said display unit, and to output said each amplified analog video sample to a column of said display panel, wherein said source driver does not include a digital-to-analog converter to convert pixel data of said analog video samples.

2. The source driver as recited in claim 1 wherein stream of analog video samples are received from an orthogonal frequency division multiplexing (OFDM) receiver within said display unit.

3. The source driver as recited in claim 1 wherein each of said amplifiers receives reference voltages from a system-on-chip or timing controller of said display unit in order to provide said voltage range.

4. The source driver as recited in claim 1 wherein said analog video samples originate at a video source.

5. An apparatus for transmitting input digital video samples, said apparatus comprising:
    a distributor that inputs digital video samples originating at a video source and distributes said digital video samples into P bit streams of digital video samples, P>=2;
    P transmitters, each transmitter receiving one of said bit streams of digital video samples and each including
        a serial-to-parallel converter arranged to receive one of said bit streams of digital video samples and to produce a parallel stream of digital video samples,
        symbol mapping circuitry that receives said stream of said digital video samples from said serial-to-parallel converter and maps each of said digital video samples to a point in a constellation to obtain pairs of in-phase (I) components and out-of-phase (Q) components, and outputs each pair of I and Q components into a bin of an inverse fast Fourier transform (IFFT) block, and
        orthogonal frequency division multiplexing (OFDM) circuitry that performs an IFFT on said IFFT block and uses OFDM to produce an electromagnetic signal representing said bit stream of digital video samples.

6. The apparatus as recited in claim 5 wherein said OFDM circuitry of said each transmitter being further arranged to transmit said electromagnetic signal to a video sink.

7. The apparatus as recited in claim 5 wherein said apparatus is located within a display unit, wherein said distributor receives said digital video samples from a timing controller (TCON) of said display unit, and wherein said OFDM circuitry of said each transmitter being further arranged to transmit said electromagnetic signal to a source driver of a panel of said display unit.

8. A video transmitter comprising:
    a distributor arranged to receive a plurality of streams of digital video samples and to distribute said digital video samples into a plurality of input vectors according to a predetermined permutation;
    a plurality of digital-to-analog converters (DACs), each DAC arranged to receive digital video samples from one of said input vectors and to convert said digital video samples of said one input vector into a series of analog video samples; and
    a plurality of orthogonal frequency division multiplexing (OFDM) transmitters, each OFDM transmitter receiving one of said series of analog video samples and transmitting said series of analog video samples as an OFDM signal over an electromagnetic pathway.

9. The video transmitter as recited in claim 8, wherein said distributor further includes
    a first line buffer that stores said plurality of input vectors; and
    a second line buffer that stores a plurality of second input vectors, wherein said distributor being further arranged to alternately distribute a line of said digital video samples between said input vectors of said first line buffer and said second input vectors of said second line buffer, and wherein said DACs alternately receive from said first line buffer while said distributor writes into said second line buffer and receive from said second line buffer while said distributor writes into said first line buffer.

10. The video transmitter as recited in claim 8 wherein said digital video samples are distributed into said input vectors at a first frequency and wherein said digital video samples are serially output from each of said input vectors at a second frequency different from said first frequency.

11. The video transmitter as recited in claim 8 wherein said predetermined permutation permits that each sampling amplifier of a source driver that receives one of said series of analog video samples may output said analog video samples to contiguous storage locations.

12. The video transmitter as recited in claim 8 wherein each of said OFDM transmitters includes
    switch circuitry that receives said one of said series of analog video samples, wherein for every pair of analog samples received, said switch circuitry outputs a first analog level of said pair as an in-phase (I) component and outputs a second analog level of said pair as an out-of-phase (Q) component into a bin of an inverse fast Fourier transform (IFFT) block, wherein said each OFDM transmitter performs an IFFT on said IFFT block to produce said OFDM signal.

13. The video transmitter as recited in claim 8 wherein each OFDM transmitter does not include a constellation for mapping.

14. The video transmitter as recited in claim 8 wherein each OFDM transmitter does not include a digital-to-analog converter.

15. A video receiver comprising:
an orthogonal frequency division multiplexing (OFDM) receiver arranged to receive an OFDM signal over an electromagnetic pathway and to output a series of analog video samples;
a collector arranged to receive said series of analog video samples and to store said series of analog video samples; and
a plurality of column drivers arranged to receive said stored series of analog video samples in parallel from said collector and to amplify each of said stored analog video samples onto a column of a display panel.

16. The video receiver as recited in claim 15 wherein said collector further comprises
a first storage array and a second storage array, wherein said collector alternately writes said analog video samples into said first storage array or into said second storage array, and wherein said column drivers alternately read from said first storage array while said collector writes into said second storage array and read from said second storage array while said collector write into said first storage array.

17. The video receiver as recited in claim 15 wherein a predetermined permutation permits said collector to store said analog video samples into contiguous storage locations.

18. The video receiver as recited in claim 15 wherein said video receiver does not include any digital-to-analog-converters (DACs) used to convert video samples.

19. The video receiver as recited in claim 15 wherein said OFDM receiver includes
combining circuitry that inputs an I component and a Q component of each bin of a fast Fourier transform (FFT) block and outputs said I and Q components as a first analog value and a second analog value in order to output a continuous stream of said analog video samples.

20. The video receiver as recited in claim 15 wherein said OFDM receiver does not include a constellation for mapping.

21. The receiver as recited in claim 15 wherein said OFDM receiver does not include an analog-to-digital converter.

22. A video transmitter comprising:
a distributor arranged to receive a plurality of video signals that include digital video samples, to distribute said digital video samples of said video signals into a plurality of input vectors according to a predetermined permutation, and to output each of said input vectors as a series of digital video samples; and
a plurality of orthogonal frequency division multiplexing (OFDM) transmitters, each OFDM transmitter receiving one of said series of digital video samples and transmitting said series of digital video samples as an OFDM signal over an electromagnetic pathway.

23. The video transmitter as recited in claim 22, wherein said distributor further includes
a first line buffer that stores said plurality of input vectors; and
a second line buffer that stores a plurality of second input vectors, wherein said distributor being further arranged to alternately distribute a line of said digital video samples between said input vectors of said first line buffer and said second input vectors of said second line buffer, and wherein said OFDM transmitters alternately receive from said first line buffer while said distributor writes into said second line buffer and receive from said second line buffer while said distributor writes into said first line buffer.

24. The video transmitter as recited in claim 22 wherein said digital video samples are distributed into said input vectors at a first frequency and wherein said digital video samples are serially output from each of said input vectors at a second frequency different from said first frequency.

25. The video transmitter as recited in claim 22 wherein said predetermined permutation permits that each sampling amplifier of a source driver that receives a series of analog video samples may output said analog video samples to contiguous storage locations.

26. The video transmitter as recited in claim 22 wherein each of said OFDM transmitters includes symbol mapping circuitry that maps each of said digital video samples to a point in a constellation to obtain in-phase (I) component and out-of-phase (Q) components.

27. The video transmitter as recited in claim 22 wherein each of said OFDM transmitters includes symbol mapping circuitry, wherein each digital video sample received by said symbol mapping circuitry includes most significant bits (MSBs) and least significant bits (LSBs), wherein for each digital video sample received, said symbol mapping circuitry distributes said MSBs of said each digital video sample to the MSBs of an in-phase (I) component and to MSBs of an out-of-phase (Q) component, wherein for each digital video sample received, said symbol mapping circuitry distributes said LSBs of said each digital video sample to the LSBs of the in-phase (I) component and to the LSBs of the out-of-phase (Q) component, and wherein said symbol mapping circuitry outputs said I and Q components into a bin of an inverse fast Fourier transform (IFFT) block.

28. A video receiver comprising:
an orthogonal frequency division multiplexing (OFDM) receiver arranged to receive an OFDM signal over an electromagnetic pathway and to output a series of digital video samples;
a digital-to-analog converter (DAC) that receives said series of digital video samples and outputs a series of analog video samples;
a collector arranged to receive said series of analog video samples and to store said series of analog video samples; and
a plurality of column drivers arranged to receive said stored series of analog video samples in parallel from said collector and to amplify each of said stored analog video samples onto a column of a display panel.

29. The video receiver as recited in claim 28 wherein said collector further comprises
a first storage array and a second storage array, wherein said collector alternately writes said analog video samples into said first storage array or into said second storage array, and wherein said column drivers alternately read from said first storage array while said collector writes into said second storage array and read from said second storage array while said collector write into said first storage array.

30. The video receiver as recited in claim 28 wherein a predetermined permutation permits said collector to store said analog video samples into contiguous storage locations.

31. The video receiver as recited in claim 28 wherein said OFDM receiver includes reverse symbol mapping circuitry to convert each point in a constellation to one of said digital video samples.

32. The video receiver as recited in claim 28 wherein said OFDM receiver includes reverse symbol mapping circuitry that places the most significant bits (MSBs) of each pair of a digital I component and a digital Q component into the MSBs of one of said digital video samples and places the least significant bits (LSBs) of said each pair into the LSBs of said one digital video sample.

33. A video transmitter comprising:
   a distributor arranged to receive a plurality of video signals that include analog video samples, to distribute said analog video samples of said video signals into a plurality of input vectors according to a predetermined permutation, and to output each of said input vectors as a series of analog video samples; and
   a plurality of orthogonal frequency division multiplexing (OFDM) transmitters, each OFDM transmitter receiving one of said series of analog video samples and transmitting said series of analog video samples as an OFDM signal over an electromagnetic pathway.

34. The video transmitter as recited in claim 33, wherein said distributor further includes
   a first line buffer that stores said plurality of input vectors; and
   a second line buffer that stores a plurality of second input vectors, wherein said distributor being further arranged to alternately distribute a line of said analog video samples between said input vectors of said first line buffer and said second input vectors of said second line buffer, and wherein said OFDM transmitters alternately receive from said first line buffer while said distributor writes into said second line buffer and receive from said second line buffer while said distributor writes into said first line buffer.

35. The video transmitter as recited in claim 33 wherein said analog video samples are distributed into said input vectors at a first frequency and wherein said analog video samples are serially output from each of said input vectors at a second frequency different from said first frequency.

36. The video transmitter as recited in claim 33 wherein said predetermined permutation permits that each sampling amplifier of a source driver that receives a series of analog video samples may output said analog video samples to contiguous storage locations.

37. The video transmitter as recited in claim 33 wherein each of said OFDM transmitters includes
   switch circuitry that receives said one of said series of analog video samples, wherein for every pair of analog samples received, said switch circuitry outputs a first analog level of said pair as an in-phase (I) component and outputs a second analog level of said pair as an out of-phase (Q) component into a bin of an inverse fast Fourier transform (IFFT) block, wherein said each OFDM transmitter performs an IFFT on said IFFT block to produce said OFDM signal.

38. The video transmitter as recited in claim 33 wherein each OFDM transmitter does not include a constellation for mapping.

39. The video transmitter as recited in claim 33 wherein each OFDM transmitter does not include a digital-to-analog converter.

* * * * *